United States Patent
Ujiie et al.

(10) Patent No.: US 11,569,984 B2
(45) Date of Patent: *Jan. 31, 2023

(54) KEY MANAGEMENT METHOD USED IN ENCRYPTION PROCESSING FOR SAFELY TRANSMITTING AND RECEIVING MESSAGES

(71) Applicant: PANASONIC INTELLECTUAL PROPERTY CORPORATION OF AMERICA, Torrance, CA (US)

(72) Inventors: Yoshihiro Ujiie, Osaka (JP); Jun Anzai, Kanagawa (JP); Yoshihiko Kitamura, Tokyo (JP); Masato Tanabe, Kanagawa (JP); Takeshi Kishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 207 days.

This patent is subject to a terminal disclaimer.

(21) Appl. No.: 17/036,470

(22) Filed: Sep. 29, 2020

(65) Prior Publication Data

US 2021/0028925 A1    Jan. 28, 2021

Related U.S. Application Data

(63) Continuation of application No. 16/686,855, filed on Nov. 18, 2019, now Pat. No. 10,826,687, which is a
(Continued)

(30) Foreign Application Priority Data

Aug. 27, 2015   (JP) ................................ 2015-168311

(51) Int. Cl.
*H04L 9/08*    (2006.01)
*H04L 9/40*    (2022.01)
(Continued)

(52) U.S. Cl.
CPC ............ *H04L 9/08* (2013.01); *B60R 16/0231* (2013.01); *H04L 9/083* (2013.01); *H04L 9/088* (2013.01);
(Continued)

(58) Field of Classification Search
CPC ......... H04L 9/08; H04L 9/0822; H04L 9/083; H04L 9/088; H04L 63/0428;
(Continued)

(56) References Cited

U.S. PATENT DOCUMENTS

2010/0150348 A1   6/2010   Fairbanks et al.
2011/0231310 A1   9/2011   Roberts et al.
(Continued)

FOREIGN PATENT DOCUMENTS

JP          2013-098719        5/2013

OTHER PUBLICATIONS

International Search Report, dated Jan. 19, 2016, in International Application No. PCT/JP2015/005223.
(Continued)

*Primary Examiner* — Benjamin A Kaplan
(74) *Attorney, Agent, or Firm* — Greenblum & Bernstein, P.L.C.

(57) ABSTRACT

A key management method serves as an electronic control unit (ECU) in an onboard network system having a plurality of ECUs that perform communication by frames via a network. The method includes storing a shared key and executing encryption processing based on the shared key. The method further includes executing inspection of a security state of the shared key stored in a case where a vehicle is in at least one of the following particular states: the vehicle is not driving and is an accessory-on state; a fuel cap of the vehicle is open, and the vehicle is not driving and is fueling; the vehicle is parked, which is indicated by the
(Continued)

gearshift; the vehicle is in a stopped state before driving, which is indicated by the gearshift; and a charging plug is connected to the vehicle, and the vehicle is electrically charging.

10 Claims, 22 Drawing Sheets

Related U.S. Application Data continuation of application No. 15/203,622, filed on Jul. 6, 2016, now Pat. No. 10,530,572, which is a continuation of application No. PCT/JP2015/005223, filed on Oct. 16, 2015.

(60) Provisional application No. 62/079,301, filed on Nov. 13, 2014.

(51) Int. Cl.
  *B60R 16/023* (2006.01)
  *H04L 67/12* (2022.01)
(52) U.S. Cl.
  CPC ........ *H04L 9/0822* (2013.01); *H04L 63/0428* (2013.01); *H04L 63/068* (2013.01); *H04L 67/12* (2013.01); *H04L 2209/84* (2013.01)
(58) Field of Classification Search
  CPC ... H04L 63/068; H04L 67/12; H04L 2209/84; B60R 16/0231
  USPC ........................................................ 380/277
  See application file for complete search history.

(56) References Cited

U.S. PATENT DOCUMENTS

| | | |
|---|---|---|
| 2012/0246463 A1 | 9/2012 | Shea et al. |
| 2014/0244069 A1 | 8/2014 | Yang |
| 2014/0310530 A1 | 10/2014 | Aguma et al. |
| 2015/0087428 A1* | 3/2015 | Dani ........................ A63F 13/65 463/43 |
| 2015/0242198 A1* | 8/2015 | Tobolski ................... G06F 8/61 717/172 |
| 2016/0006723 A1 | 1/2016 | Wilson |
| 2016/0139755 A1 | 5/2016 | Bushmitch |

OTHER PUBLICATIONS

CAN Specification Version 2.0, 1991, Part A [online] CAN in Automation (CIA), (searched on Nov. 14, 2014), Internet<URL:http://www.can-cia.org fileadmin/cia/specifications/CAN20A.pdf>.
JH. Song et al., "The AES-CMAC Algorithm" Network Working Group, RFC 4493, Jun. 2006.
Extended European Search Report, dated Sep. 28, 2017 from the European Patent Office (EPO), for the related European Patent Application No. 15859135.4.
Christian Schleiffer et al., "Secure Key Management—A Key Feature for Modern Vehicle Electronics", SAE Technical Paper Series, vol. 1, Apr. 16, 2013 (Apr. 16, 2013), pp. 1-8, XP055255678.
https://priuschat.com/threads/driving-without-the-fob.105613/, Mar. 22, 2012.

* cited by examiner

FIG. 4

| RECEPTION ID LIST |
| --- |
| 1 |
| 2 |
| 3 |
| 4 |
| 101 |
| 102 |
| 103 |
| 104 |

FIG. 5

| CAN-ID | SHARED KEY (Km) |
| --- | --- |
| 1 | 0 × 1A4DE4FC02F66B77 |
| 2 | 0 × 27AB6EAC81773F65 |
| 3 | 0 × CB939EA0CE378A7E |
| 4 | 0 × 03E46FF28CBC8D7A |

FIG. 6

| CAN-ID | SESSION KEY (Ks) |
| --- | --- |
| 1 | 0 × 7678A87B |
| 2 | |
| 3 | |
| 4 | |

FIG. 8

| RECEPTION ID LIST |
|---|
| 1 |
| 3 |
| ⋮ |

FIG. 9

| RECEPTION ID LIST |
|---|
| 2 |
| 4 |
| ⋮ |

FIG. 10

| CAN-ID | DATA |
|---|---|
| 1 | 0 1 0×1a 0×c4 0×f7 0×d3 |
| 1 | 1 2 0×f9 0×3b 0×65 0×9e |
| 1 | 2 3 0×34 0×5c 0×ef 0×79 |
| 1 | 3 4 0×90 0×2a 0×e3 0×dd |
| 1 | 4 5 0×31 0×2c 0×d5 0×ee |
| ... | ... |

FIG. 11

| CAN-ID | DATA |
|---|---|
| 2 | 100 1 0×34 0×5c 0×ef 0×79 |
| 2 | 90 2 0×31 0×2c 0×d5 0×ee |
| 2 | 80 3 0×90 0×2a 0×e3 0×dd |
| 2 | 70 4 0×1a 0×c4 0×f7 0×d3 |
| 2 | 60 5 0×f9 0×3b 0×65 0×9e |
| ... | ... |

FIG. 12

| CAN-ID | DATA |
|---|---|
| 3 | 1 1 0×31 0×2c 0×d5 0×ee |
| 3 | 1 2 0×34 0×5c 0×ef 0×79 |
| 3 | 0 3 0×f9 0×3b 0×65 0×9e |
| 3 | 0 4 0×90 0×2a 0×e3 0×dd |
| 3 | 0 5 0×1a 0×c4 0×f7 0×d3 |
| ... | ... |

FIG. 13

| CAN-ID | DATA |
|---|---|
| 4 | 0 1 0×90 0×2a 0×e3 0×dd |
| 4 | 10 2 0×31 0×2c 0×d5 0×ee |
| 4 | 20 3 0×1a 0×c4 0×f7 0×d3 |
| 4 | 30 4 0×f9 0×2b 0×65 0×9e |
| 4 | 40 5 0×34 0×5c 0×ef 0×79 |
| ... | ... |

FIG. 14

| CAN-ID | SHARED KEY (Km) | EXPIRATION DATE |
|---|---|---|
| 1 | 0×1A4DE4FC02F66B77 | 12/31/2034 |

FIG. 21

| CAN-ID | SHARED KEY (Km) | SERIAL ID |
|---|---|---|
| 1 | 0 × 1A4DE4FC02F66B77 | 0 × 10000001 |
| 2 | 0 × 27AB6EAC81773F65 | 0 × 10000002 |
| 3 | 0 × CB939EA0CE378A7E | 0 × 10000003 |
| 4 | 0 × 03E46FF28CBC8D7A | 0 × 10000004 |

FIG. 27

| NUMBER | CAN-ID |
|---|---|
| 1 | 201 |
| 2 | 202 |
| 3 | 203 |
| 4 | 204 |

KEY MANAGEMENT METHOD USED IN ENCRYPTION PROCESSING FOR SAFELY TRANSMITTING AND RECEIVING MESSAGES

CROSS REFERENCE TO RELATED APPLICATIONS

This is a continuation application of U.S. patent application Ser. No. 16/686,855, filed Nov. 18, 2019, which is a continuation application of U.S. patent application Ser. No. 15/203,622, filed Jul. 6, 2016, now U.S. Pat. No. 10,530,572, issued Jan. 7, 2020, which is a continuation application of International Patent Appl. No. PCT/JP2015/005223, filed Oct. 16, 2015, which claims the benefit of U.S. Provisional Patent Appl. No. 62/079,301, filed Nov. 13, 2014, and priority to Japanese Patent Appl. No. 2015-168311, filed Aug. 27, 2015. The disclosure of each of the above-identified documents, including the specification, drawings, and claims, is incorporated herein by reference in its entirety.

1. Technical Field

The present disclosure relates to key management technology used in encryption processing for safely transmitting and receiving messages (frames) over an onboard network.

2. Description of the Related Art

In recent years, a great number of electronic control units (ECU) have been placed in systems in automobiles. A network connecting these ECUs is referred to as an onboard network. Many standards exist for onboard networks. The most mainstream of these is a standard called Controller Area Network (CAN), that is stipulated in ISO11898-1 (see CAN Specification 2.0 Part A, [online], CAN in Automation (CiA), [searched Nov. 14, 2014], Internet (URL: http://www.can-cia.org/fileadmin/cia/specifications/CAN20A.pdf)).

A CAN is configured using two busses, and each ECU connected to the buses is called a node. Each node connected to a bus transmits/receives messages called frames. No identifiers indicating the transmission destination or transmission source exist in CAN, with the transmitting node attaching an ID (called CAN-ID) to each frame and transmitting (i.e., sending out signals to the bus), and the receiving nodes only receiving frames of a predetermined ID (i.e., reading signals from the bus). The Carrier Sense Multiple Access/Collision Avoidance (CSMA/CA) format is employed, so when multiple nodes transmit at the same time, arbitration by CAN-ID is performed, with frames having a smaller message ID value being transmitted with higher priority.

Now, CAN does not have a security function assuming a case where unauthorized frames are transmitted, so there is a possibility that the vehicle might be unauthorizedly controlled by an unauthorized node being connected to the bus in the onboard network and the unauthorized frame unauthorizedly transmitting a frame. There is known a technology in CAN where frames transmitted by authorized ECUs are identified by adding a message authentication code (MAC) to the data field and transmitting, in order to prevent control by such unauthorized frames (see Japanese Unexamined Patent Application Publication No. 2013-98719). A temporary session key is preferably periodically generated and used in generating MACs, to improve resistance against brute-force attacks against MACs to try to identify the key to generate MACs.

Now, in a case where a particular ECU handles generating of a session key, the session key can be safely distributed (transmitted) among ECUs if the session keys are encrypted using a key shared among authorized ECUs beforehand (called a "shared key"). However, if leakage of the shared key cannot be appropriately detected, this enables an unauthorized ECU to receive the session key and generate MACs.

SUMMARY

One non-limiting and exemplary embodiment provides a key management method for securing security of an onboard network having multiple ECUs storing a shared key. The present disclosure also provides an onboard network system and key management device for securing security in communication among ECUs storing a shared key.

In one general aspect, the techniques disclosed here feature a key management method in an onboard network system having a plurality of electronic control units that perform communication by frames via a bus, the method including:

storing, in a first-type electronic control unit out of the plurality of electronic control units, a shared key to be mutually shared with one or more second-type electronic control units other than the first-type electronic control unit, the shared key also being stored in the one or more second-type electronic control units other than the first-type electronic control unit;

acquiring, by each of the second-type electronic control units, a session key by communication with the first-type electronic control unit based on the stored shared key, and after this acquisition, executing encryption processing regarding a frame transmitted or received via the bus, using this session key; and executing, by the first-type electronic control unit, inspection of a security state of the shared key stored by the second-type electronic control units in a case where a vehicle in which the onboard network system is installed is in a particular state.

According to the present disclosure, the security state of the shared key is inspected on a timely basis, so security of the onboard network system can be secured.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram illustrating an example of a reception ID list that the master ECU (key managing device) stores;

FIG. 5 is a diagram illustrating an example of a shared key list that the master ECU (key managing device) stores, according to the first embodiment;

FIG. 6 is a diagram illustrating an example of a session key list that the master ECU (key managing device) stores;

FIG. 8 is a diagram illustrating an example of a reception ID list that the ECU stores;

FIG. 9 is a diagram illustrating an example of a reception ID list that the ECU stores;

FIG. 10 is a diagram illustrating an example of CAN-IDs and data fields in frames transmitted from an ECU connected to an engine;

FIG. 11 is a diagram illustrating an example of CAN-IDs and data fields in frames transmitted from an ECU connected to the brakes;

FIG. 12 is a diagram illustrating an example of CAN-IDs and data fields in frames transmitted from an ECU connected to a door open/close sensor;

FIG. 13 is a diagram illustrating an example of CAN-IDs and data fields in frames transmitted from an ECU connected to a window open/close sensor;

FIG. 14 is a diagram illustrating an example of a shared key that is stored by ECUs;

FIG. 21 is a diagram illustrating an example of a shared key list that the master ECU (key managing device) according to the second embodiment stores;

FIG. 27 is a diagram illustrating an example of a sequence recording list according to the third embodiment;

DETAILED DESCRIPTION

Figure 1:
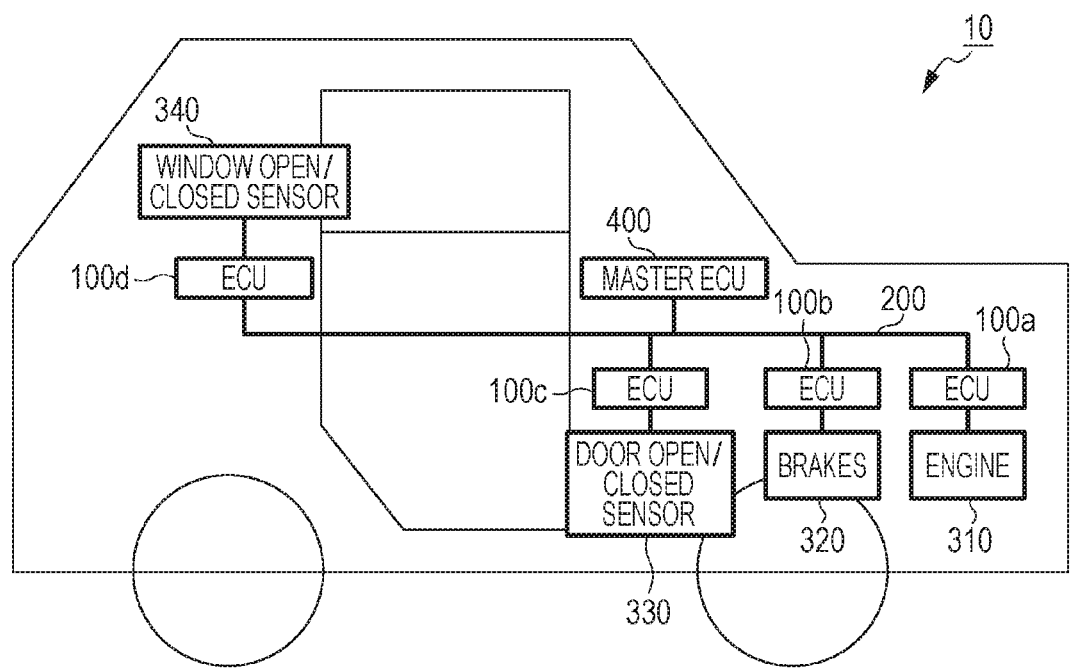
FIG. 1 is a diagram illustrating the overall configuration of an onboard network system according to a first embodiment.

A key management method according to an aspect of the present disclosure is a key management method in an onboard network system having a plurality of electronic control units that perform communication by frames via a bus. The method includes: storing, in a first-type electronic control unit out of the plurality of electronic control units, a shared key to be mutually shared with one or more second-type electronic control units other than the first-type electronic control unit, the shared key also being stored in the one or more second-type electronic control units other than the first-type electronic control unit; acquiring, by each of the second-type electronic control units, a session key by communication with the first-type electronic control unit based on the stored shared key, and after this acquisition, executing encryption processing regarding a frame transmitted or received via the bus, using this session key; and executing, by the first-type electronic control unit, inspection of a security state of the shared key stored by the second-type electronic control units in a case where a vehicle in which the onboard network system is installed is in a particular state.

The inspection may be an inspection relating to an expiration date of the shared key. Accordingly, expiration of the shared key can be detected, and acquisition of session keys by an unauthorized ECU having an expired shared key can be prevented.

The first-type electronic control unit may receive, from the second-type electronic control unit, a frame including information indicating the expiration date regarding the shared key that the second-type electronic control unit holds, perform the inspection by distinguishing whether or not the expiration date has already expired, an in a case where the expiration date has not expired, perform communication to give the second-type electronic control unit a session key, but in a case where the expiration date has expired, execute control for notification. Accordingly, notification is made in a case where the security state of the shared key is inappropriate due to the existence of an ECU having an expired shared key, so security can be secured.

The inspection may be an inspection relating to a serial ID of the second-type electronic control unit that stores the shared key. Accordingly, the existence of an unauthorized ECU that has unauthorizedly copied (duplicated) the share key can be detected, and acquisition of a session key by the unauthorized ECU can be prevented.

The first-type electronic control unit may receive, from the second-type electronic control unit, a frame including information indicating the serial ID of the second-type electronic control unit, perform the inspection by distinguishing whether or not the security state of the shared key is appropriate based on the serial ID and predetermined matching information stored beforehand, and in a case where the security state of the shared key is appropriate, performs communication to give the second-type electronic control unit a session key, but in a case where the security state of the shared key is not appropriate, execute control for notification. Accordingly, notification is made in a case where the security state of the shared key is inappropriate due to the existence of the ECU having an unauthorized serial ID, so security can be secured.

In a case where the plurality of electronic control units includes a plurality of the second-type electronic control units, the inspection may be an inspection relating to a transmission order of frames at the plurality of second-type electronic control units. Accordingly, inappropriate transmission order of frames among the ECUs can be detected, and acquisition of a session key by an unauthorized ECU can be prevented.

The first-type electronic control unit may transmit a frame indicating a predetermined request and thereafter sequentially receive frames from the plurality of second-type electronic control units, and based on the IDs of the frames, perform the inspection by distinguishing whether or not the IDs have been received in an order that a predetermined order list indicates. Accordingly, whether or not an unauthorized ECU exists can be detected from the order of responses from each ECU after having transmitted a frame (survival confirmation frame or the like) indicating a predetermined request.

The particular state may be a state where the vehicle is not driving, with the first-type electronic control unit executing the inspection only in a case of the particular state. Accordingly, inspection of the security state can be appropriately performed while avoiding increased processing load on the ECUs increased traffic on the bus and so forth while the vehicle is driving.

The first-type electronic control unit may execute the inspection by communication with a server located externally from the vehicle. Accordingly, the load of the inspection of the security state within the onboard network system can be reduced. Also, inspections using information collected externally from the vehicle (information obtained from other onboard network systems and so forth) may also be performed.

The plurality of electronic control units may perform communication by frames via the bus, following a CAN protocol. Accordingly, security can be secured in a onboard network system following CAN.

An onboard network system according to an aspect of the present disclosure is an onboard network system having a plurality of electronic control units that perform communication by frames via a bus. A first-type electronic control unit out of the plurality of electronic control units, stores a shared key to be mutually shared with one or more second-type electronic control units other than the first-type electronic control unit, the shared key also being stored in the one or more second-type electronic control units other than the first-type electronic control unit, each of the second-type electronic control units acquire a session key by communication with the first-type electronic control unit based on the stored shared key, and after this acquisition, execute encryption processing regarding a frame transmitted or received via the bus, using this session key, and the first-type electronic control unit executes inspection of a security state of the shared key stored by the second-type electronic control units in a case where a vehicle in which itself is installed is in a particular state. Thus, security of the onboard network system can be secured.

A key management device according to an aspect of the present disclosure is a key management device serving as an electronic control unit in an onboard network system having a plurality of electronic control units that perform communication by frames via a bus. The key management device stores a shared key to be mutually shared with one or more electronic control units other than itself out of the plurality of electronic control units, for transmission of a session key used for encryption relating to a frame, the shared key also being stored in the one or more second-type electronic control units other than the first-type electronic control unit, and the key management device executes inspection of a security state of the shared key stored by the electronic control units other than itself in a case where a vehicle in which itself is installed is in a particular state. Thus, security of the onboard network system can be secured.

These general or specific aspects may be realized by a system, method, integrated circuit, computer program, or computer-readable recording medium such as a CD-ROM, and may be realized by any combination of a system, method, integrated circuit, computer program, and recording medium.

The following is a detailed description of an onboard network system according to embodiments with reference to the drawings. Note that the embodiments described below are all specific examples of the present disclosure. Accordingly, values, components, placements and connected states of components, steps (processes) and the order of steps, and so forth illustrated in the following embodiments, are only exemplary, and do not restrict the present disclosure. Components in the following embodiments which are not included in an independent Claim are optional components. The drawings are all schematic diagrams and are not necessarily created in an exact manner.

First Embodiment

A key management method used in an onboard network system 10 in which multiple ECUs including a master ECU (key managing device) 400 communicate via a bus will be described below with reference to the drawings. An example will be described in the present embodiment regarding a key management method, where whether or not the risk of leaking of a shared key, which each ECU stores, has increased (i.e., whether or not the state is one where updating of the shared key is necessary) is determined (verified) regarding security, based on an expiration data of the shared key, in accordance with the state of the vehicle.

1.1 Overall Configuration of Onboard Network System

FIG. 1 is a diagram illustrating the overall configuration of the onboard network system 10 according to a first embodiment. The onboard network system 10 is an example of a network communication system that communicates following the CAN protocol, and is a network communication system in an automobile in which is installed various types of devices such as control devices, sensors, and so forth. The onboard network system 10 has multiple devices that communicate by frames via a bus following the CAN protocol, and uses a key management method. Specifically, the onboard network system 10 is configured including a bus 200, the master ECU (key management device) 400, and nodes like ECUs connected to the bus, such as ECUs 100a through 100d and so forth, that are connected to various types of devices, as illustrated in FIG. 1. The onboard network system 10 may include many more ECUs than the master ECU 400 and ECUs 100a through 100d, but description will be made here focusing on the master ECU 400 and ECUs 100a through 100d for sake of convenience. An ECU is a device that includes, for example, digital circuits such as a processor (microprocessor), memory, and so forth, analog circuits, communication circuits, and so forth. The memory is read-only memory (ROM), random access memory (RAM), and so forth, capable of storing a control program (computer program) to be executed by the processor. The ECU can realize various functions by the processor operating following the control program (computer program), for example. The computer program is configured as a combination of multiple command codes representing instructions to the processor, to achieve predetermined functions.

The ECUs 100a through 100d are connected to the bus 200, and are connected to an engine 310, brakes 320, a door open/closed sensor 330, and a window opened/closed sensor 340, respectively. Each of the ECUs 100a through 100d acquires the state of the device to which it is connected (engine 310, etc.), and periodically transmits frames (later-described data frames) and so forth representing the state to the network (i.e., the bus).

There is one master ECU 400 connected to the bus 200, as a type of ECU serving as a key managing device that has the role of handling processing relating to keys used in exchanging frames among the ECUs. The master ECU 400 has the same shared key as one or more ECUs out of the multiple ECUs connected to the bus 200 besides itself, to use for transmitting session keys mutually between the one or more ECUs for encryption processing relating to frames (including MAC processing), and functions to manage the security state of the shared key. The master ECU 400 may record a log of the security state of the shared key in a recording medium such as memory, a hard disk, or the like, as necessary. The master ECU 400 may have a display device such as a liquid crystal device (LCD) or the like provided on an instrument panel or the like of the automobile, so as to notify the driver by displaying information according to the security state of the shared key.

The ECUs on the onboard network system 10 including the master ECU 400 exchange frames following the CAN protocol. Frames in the CAN protocol include data frames, remote frames overload frames, and error frames. Description will be made primarily here regarding data frames, for sake of convenience.

1.2 Data Frame Format

Figure 2:
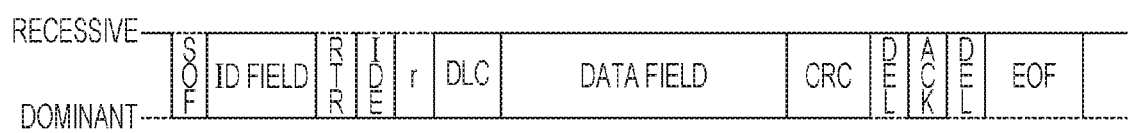
FIG. 2 is a diagram illustrating the format of a data frame stipulated by the CAN protocol.

The following is a description of a data frame which is a type of frame used on a network according to the CAN protocol. FIG. 2 is a diagram illustrating a format of a data frame stipulated by the CAN protocol. The diagram illustrates a data frame according to a standard ID format stipulated in the CAN protocol. A data frame is configured including the fields of a Start Of Frame (SOF), ID field, Remote Transmission Request (RTR), Identifier Extension (IDE), reserved bit "r", Data Length Code (DLC), data field, Cyclic Redundancy Check (CRC) sequence, CRC delimiter "DEL", Acknowledgement (ACK) slot, ACK delimiter "DEL", and End Of Frame (EOF).

The SOF is made up of 1-bit dominant. The state of the bus is recessive when idle, and start of transmission of a frame is notified by being changed to dominant by the SOF.

The ID field is made up of 11 bits, and is a field storing an ID (CAN-ID) which is a value indicating the type of data. Design has been implemented so that in a case where multiple nodes start transmission at the same time, frames with smaller ID values are given higher priority, in order to perform communication arbitration using this ID field.

The RTR is a value identifying a data frame and remote frame, and is made up of 1-bit dominant in a data frame.

The IDE and "r" are each made up of 1-bit dominant.

The DLC is made up of four bits, and is a value indicating the length of the data field. Note that the IDE, "r", and DLC together are called a control field.

The data field is a maximum of 64 bits, and is a value indicating the content of the data being transmitted. The length can be adjusted in 8-bit increments. The CAN protocol does not stipulate the specification of data being transmitted; that is set at the onboard network system 10. Accordingly, the specification is dependent on the model, manufacturer (manufacturing maker), or the like.

The CRC sequence ("CRC" illustrated in FIG. 2) is made up of 15 bits. This is calculated from the transmitted values of the SOF, ID field, control field, and data field.

The CRC delimiter (the "DEL" between the "CRC" and "ACK" in FIG. 2) is made up of 1-bit recessive, and is a sectioning symbol representing the end of the CRC sequence. The CRC sequence and CRC delimiter are collectively referred to as the CRC field.

The ACK slot (the "ACK" in FIG. 2) is made up of one bit. The transmitting node performs transmission with the ACK slot set to recessive. The receiving node transmits the ACK slot as dominant if up to the CRC sequence has been received normally. Dominant has higher priority than recessive, so if the ACK slot is dominance after transmission, so the transmitting node will be able to confirm that one of the receiving nodes has succeeded in reception.

The ACK delimiter (the "DEL" between the "ACK" and "EOF" in FIG. 2) is made up of 1-bit recessive, and is a sectioning symbol representing the end of the ACK.

The EOF is made up of 7-bits recessive, and represents the end of the data frame.

1.3 Configuration of Master ECU 400

Figure 3:
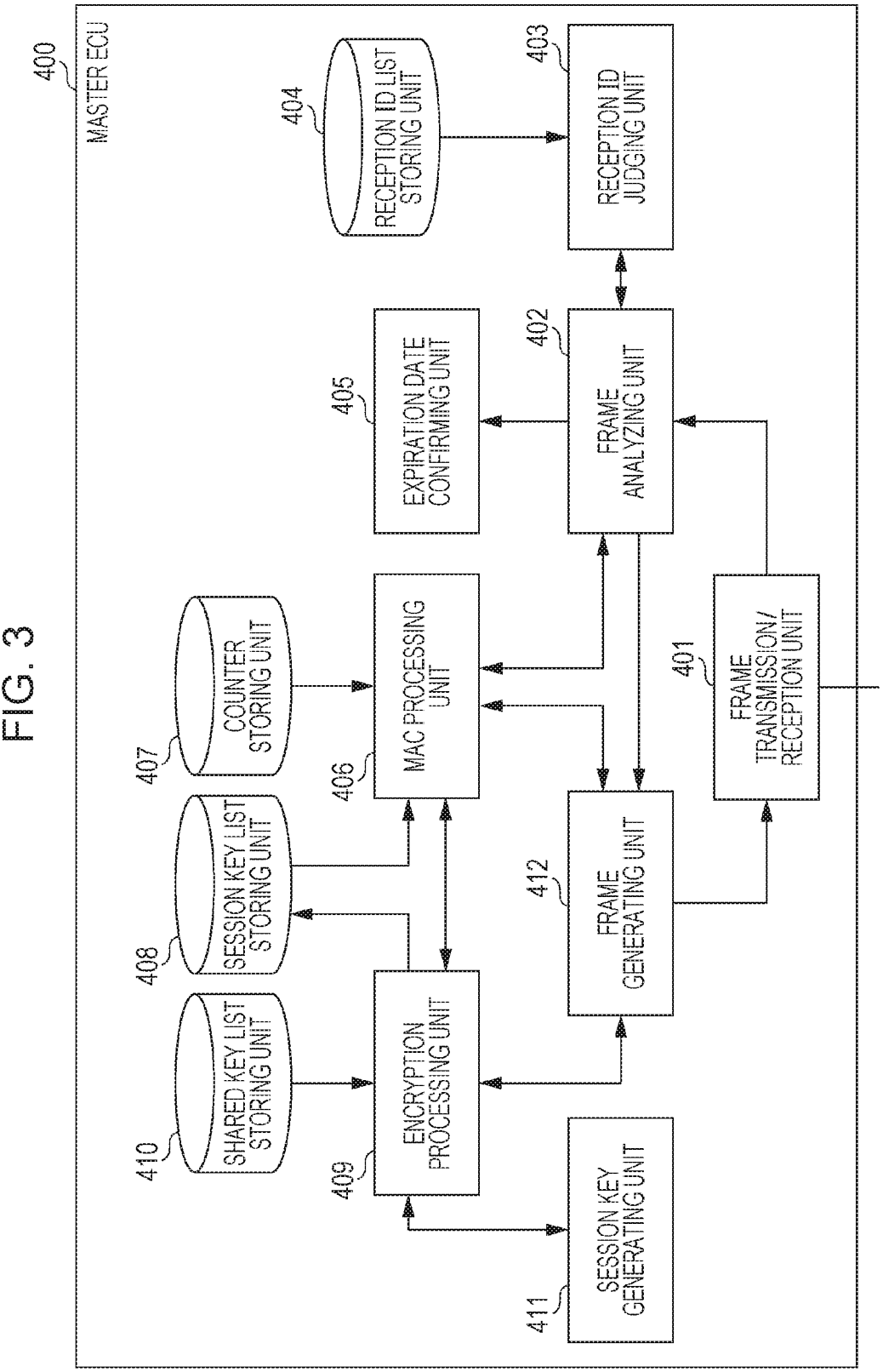
FIG. 3 is a configuration diagram of a master ECU (key managing device) according to the first embodiment.

FIG. 3 is a configuration diagram of the master ECU 400. The master ECU 400 includes a frame transmission/reception unit 401, a frame analyzing unit 402, a reception ID judging unit 403, a reception ID list storing unit 404, an expiration data confirming unit 405, a MAC processing unit 406, a counter storing unit 407, a session key list storing unit 408, an encryption processing unit 409, a shared key list storing unit 410, a session key generating unit 411, and a frame generating unit 412. These components are functional components, and the functions thereof are realized by a communication circuit in the master ECU 400, a processor or digital circuit of the like that executes the program stored in the memory, and so forth.

The frame transmission/reception unit 401 transmits and receives frames following the CAN protocol to and from the bus 200. Frames are received from the bus 200 one bit at a time, and transferred to the frame analyzing unit 402. The contents of frames received from the frame generating unit 412 are transmitted to the bus 200 one bit at a time.

The frame analyzing unit 402 receives the values of frames from the frame transmission/reception unit 401, and performs analysis so as to map to the fields in the frame format stipulated in the CAN protocol. The frame analyzing unit 402 transfers a value determined to be an ID field to the reception ID judging unit 403. The frame analyzing unit 402 decides, in accordance with determination results notified from the reception ID judging unit 403, whether to transfer the value of an ID field (CAN-ID) and a data field appearing after the ID field, to the MAC processing unit 406, or to cancel reception of frames after having received the determination results (i.e., to stop analyzing that frame). After transferring to the MAC processing unit 406, the processing results at the MAC processing unit 406 (the MAC verification results) are received, and in a case of having been determined to be normal (i.e., in a case where MAC verification has been successful), the value of the ID field and the data field appearing after the ID field are notified to the expiration data confirming unit 405. In a case where the frame is judged not to be following the CAN protocol, such as the CRC value not matching, or an item fixed to dominant being recessive, the frame analyzing unit 402 notifies the frame generating unit 412 to transmit an error frame. In a case of having received an error frame, i.e., in a case of having analyzed from the value of a received frame that the frame is an error frame, the frame analyzing unit 402 discards that frame thereafter, i.e., stops analyzing the frame.

The reception ID judging unit 403 receives the value of the ID field notified from the frame analyzing unit 402 and determines whether or not to receive the fields in the frame after that ID field, in accordance with a CAN-ID list that the reception ID list storing unit 404 stores. The reception ID judging unit 403 notifies the determination results thereof to the frame analyzing unit 402.

The reception ID list storing unit 404 stores the reception ID list, that is a list of CAN-IDs that the master ECU 400 receives. FIG. 4 illustrates an example of a reception ID list.

The expiration data confirming unit 405 acquires a value indicating the expiration date of the shared key, that is the value of the data field, for an expiration date notification frame identified by the CAN-ID received from the frame analyzing unit 402, and inspects the expiration date by comparing with the current point-in-time. In a case where the expiration date has already elapsed, the expiration data confirming unit 405 records this in a log. Also, in a case where the expiration date has already elapsed, the expiration data confirming unit 405 notifies the driver by displaying information on the display device to the effect that the expiration date has elapsed. In a case where the expiration date has elapsed, the master ECU 400 can keep session keys from being transmitted to the ECUs.

The MAC processing unit 406 calculates a MAC value using a session key corresponding to the CAN-ID that is stored in the session key list storing unit 408, with regard to a value obtained by linking the CAN-ID notified from the frame analyzing unit 402, a portion of the data field excluding the MAC value, and a reception counter value corresponding to the CAN-ID stored in the counter storing unit 407. The MAC processing unit 406 then performs comparison and verification against the MAC value included in the data field, and notifies the verification results to the frame analyzing unit 402. The result of having obtained a MAC value by calculation, with regard to the value (linked value) obtained by linking the CAN-ID notified from the frame generating unit 412, a value of data for the data field to be transmitted, and a transmission counter value corresponding to the CAN-ID stored in the counter storing unit 407, is notified to the frame generating unit 412. Advanced Encryption Standard-Cipher-based Message Authentication Code (AES-CMAC, see RFC4493: "The AES-CMAC Algorithm") is used here as the MAC calculation method, with calculation being performed on the above-described linked value using a MAC key (session key) of a value padded to a predetermined block worth, and the four leading bytes of the obtained calculation results are taken as the MAC value. Note that the size of the MAC value, and the calculation method, are only an example, and these are not restrictive. A MAC is generated reflecting a transmission counter value incremented each time a frame is transmitted, so even if data frames including the same data are transmitted multiple times, for example, the MAC value given (i.e., added) to the data frame changes with each transmission.

The counter storing unit 407 stores counter values necessary for calculating MAC values, one each for transmission and for receipt, for each CAN-ID. In a case where a frame has been successfully transmitted, the transmission counter value is incremented, and in a case where a frame has been successfully received, the reception counter value is incremented.

The session key list storing unit 408 stores a list where session keys used for encryption processing relating to frames, i.e., session keys used by the MAC processing unit 406 to calculate MAC values, are correlated with CAN-IDs (session key list). The session key list storing unit 408 saves session keys notified from the encryption processing unit 409 along with CAN-IDs as a session key list.

The encryption processing unit 409 receives a session key generating request from the frame generating unit 412 along with a CAN-ID, notifies the session key generating unit 411 of the session key generating request, and receives a session key generated and issued (transmitted) by the session key generating unit 411. The encryption processing unit 409 encrypts the issued session key using a shared key (shared key corresponding to the CAN-ID) stored in the shared key list storing unit 410, and notifies the frame generating unit 412. The encryption processing unit 409 also notifies the session key list storing unit 408 of the session key issued by the session key generating unit 411 along with the CAN-ID, so as to be saved in the session key list storing unit 408.

The shared key list storing unit 410 stores a shared key list that is a list correlating shared keys shared beforehand for use in transmission of session keys among the ECUs, with the CAN-IDs. One shared key is designated for each CAN-ID. The correlation between a certain CAN-ID and shared key in the shared key list indicates the correlation between the ECU transmitting the frame including that CAN-ID, and the shared key. Besides designating a shared key for each CAN-ID, one shared key may be designated for all ECUs. Alternatively, in a case where the bus 200 is of a configuration where multiple sub-nets are connected by a gateway, the bus 200 may designate one shared key for each sub-net (each set of ECUs connected to a sub-net). FIG. 5 illustrates an example of a shared key list that the shared key list storing unit 410 stores.

The session key generating unit 411 receives the session key generating request, and generates and issues a session key. Examples of a session key generating method include using a method of calculating a session key using a hash function, which is a one-way function, from a serial ID unique to the master ECU 400. FIG. 6 illustrates an example of a session key list, in which is described a session key that the session key generating unit 411 generates, and the session key list storing unit 408 stores.

The frame generating unit 412 configures an error frame in accordance with the error frame transmission request notified from the frame analyzing unit 402, and notifies the frame transmission/reception unit 401 to transmit the error frame. The frame generating unit 412 notifies the encryption processing unit 409 of the session key generating request, and receives the encrypted session key. The frame generating unit 412 notifies the MAC processing unit 406 of the CAN-ID decided beforehand, and the encrypted session key notified from the encryption processing unit 409, and receives the MAC value calculation results. The frame generating unit 412 configures a data frame to which is attached the encrypted session key received from the encryption processing unit 409, the MAC value notified from the MAC processing unit 406, and the predetermined CAN-ID, and notifies the frame transmission/reception unit 401 to transmit the data frame.

The master ECU 400 has a function of, upon detecting that the vehicle in which the onboard network system 10 is installed is in an accessory-on (ACC-ON) state, causing the frame generating unit 412 to generate an inquiry frame for the expiration date of the shared key, and transmitting to the frame transmission/reception unit 401. Vehicle states such as starting the engine, ACC-ON, stopped, and so forth, may be detected by detection mechanisms such as various types of sensors and so forth, and transmitted from the detection mechanisms directly to the master ECU 400 or via other ECUs.

1.4 Reception ID List Example 1

FIG. 4 is a diagram illustrating an example of a reception ID list (CAN-ID list) that the master ECU 400 stores in the reception ID list storing unit 404. The reception ID list illustrated in FIG. 4 is used for the master ECU 400 to selectively receive and process frames of which the CAN-ID value is one of "1", "2", "3", "4", "101", "102", "103", and "104". In this example, the CAN-IDs "101", "102", "103", and "104" of expiration date notification frames that the ECUs transmit are values obtained by adding a certain values to the CAN-IDs "1", "2", "3", and "4" that these ECUs basically transmit.

1.5 Shared Key List Example

FIG. 5 is a diagram illustrating an example of a shared key list that the master ECU 400 stores in the shared key list storing unit 410. The shared key list is a list where CAN-IDs and shared keys (Km) are correlated. The shared key list illustrated in FIG. 5 indicates that shared key "0x1A4DE4FC02F66B77" has been assigned to CAN-ID "1", shared key "0x27AB6EAC81773F65" has been assigned to CAN-ID "2", shared key "0xCB939EA0CE378A7E" has been assigned to CAN-ID "3", and shared key "0x03E46FF28CBC8D7A" has been assigned to CAN-ID 1.6 Session Key List Example FIG. 6 is a diagram illustrating an example of a session key list that the master ECU 400 stores in the session key list storing unit 408. The session key list is a list where CAN-IDs and session keys (Ks) are correlated. The session key list illustrated in FIG. 6 indicates that the same session key "0x7678A87B" has been assigned to the CAN-IDs "1", "2", "3", and "4".

1.7 Configuration of ECU 100a

Figure 7:
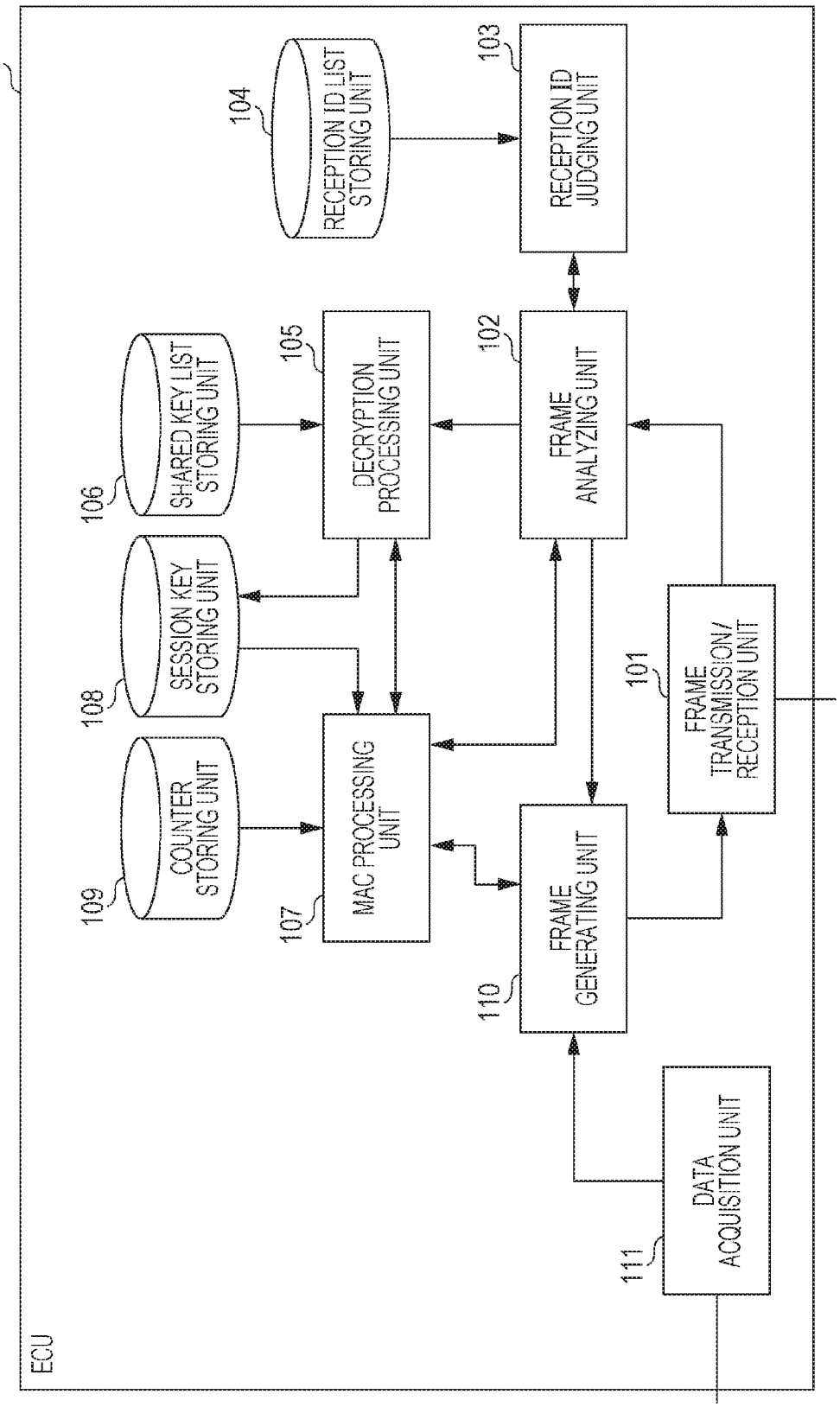
FIG. 7 is a configuration diagram of an ECU according to the first embodiment.

FIG. 7 is a configuration diagram of the ECU 100a. The ECU 100a is configured including a frame transmission/reception unit 101, a frame analyzing unit 102, a reception ID judging unit 103, a reception ID list storing unit 104, a decryption processing unit 105, a shared key list storing unit 106, a MAC processing unit 107, a session key storing unit 108, a counter storing unit 109, a frame generating unit 110, and a data acquisition unit 111. These components are functional components, and the functions thereof are realized by a communication circuit in the ECU 100a, a processor or digital circuit of the like that executes the control program stored in the memory, and so forth. The ECUs 100b through 100d also have basically the same configuration as the ECU 100a.

The frame transmission/reception unit 101 transmits and receives frames following the CAN protocol to and from the bus 200. Frames are received from the bus 200 one bit at a time, and transferred to the frame analyzing unit 102. The contents of frames received from the frame generating unit 110 are transmitted to the bus 200.

The frame analyzing unit 102 receives the values of frames from the frame transmission/reception unit 101, and performs analysis so as to map to the fields in the frame format stipulated in the CAN protocol. The frame analyzing unit 102 transfers a value determined to be an ID field to the reception ID judging unit 103. The frame analyzing unit 102 decides, in accordance with determination results notified from the reception ID judging unit 103, whether to transfer the value of an ID field (CAN-ID) and a data field appearing after the ID field, to the MAC processing unit 107, or to cancel reception of frames after having received the determination results (i.e., to stop analyzing that frame). After transferring to the MAC processing unit 107, the processing results at the MAC processing unit 107 (the MAC verification results) are received, and in a case of having been determined to be normal (i.e., in a case where MAC verification has been successful), the value of the ID field and the data field appearing after the ID field are notified to the decryption processing unit 105. In a case where the frame is judged not to be following the CAN protocol, the frame analyzing unit 102 notifies the frame generating unit 110 to transmit an error frame. In a case of having received an error frame, i.e., in a case of having analyzed from the value of a received frame that the frame is an error frame, the frame analyzing unit 102 discards that frame thereafter, i.e., stops analyzing the frame.

The reception ID judging unit 103 receives the value of the ID field notified from the frame analyzing unit 102 and determines whether or not to receive the fields in the frame after that ID field, in accordance with a CAN-ID list that the reception ID list storing unit 104 stores. The reception ID judging unit 103 notifies the determination results thereof to the frame analyzing unit 102.

The reception ID list storing unit 104 stores the reception ID list, that is a list of CAN-IDs that the ECU 100a receives. FIG. 8 illustrates an example of a reception ID list that is a CAN-ID list.

The decryption processing unit 105 is notified of the encrypted session key by the frame analyzing unit 102, along with a CAN-ID decided beforehand for transmission of the session key, and thereupon uses the shared key that the shared key list storing unit 106 stores to perform decryption processing, and acquires the session key. The acquired session key is notified to the session key storing unit 108 to be saved. In a case of having received notification from the frame analyzing unit 102 of data along with a CAN-ID other than for session key transmission, the decryption processing unit 105 performs processing according functions that differ for each ECU, in accordance with the received data. For example, the ECU 100a connected to the engine 310 has a function of sounding an alarm sound in a state where a door is open and the speed is above 30 Km/hour. The ECU 100a has a speaker or the like for sounding the alarm sound, for example. the ECU 100a manages data (e.g., information indicating the state of the door) received from other ECUs, and performs processing such as sounding an alarm sound under predetermined conductions based on the speed acquired from the shared engine 310, for example.

The shared key list storing unit 106 stores a shared key corresponding to the CAN-ID that the ECU 100a uses for transmitting (i.e., the shared key corresponding to the ECU 100a), and information indicating the expiration date of that shared key. An example of a shared key stored by the shared key list storing unit 106 will be described later with reference to FIG. 14.

The MAC processing unit 107 calculates a MAC value using a session key corresponding to the CAN-ID that is stored in the session key storing unit 108, with regard to a value obtained by linking the CAN-ID notified from the frame analyzing unit 102, a portion of the data field excluding the MAC value, and a reception counter value corresponding to the CAN-ID that is stored in the counter storing unit 109. The MAC processing unit 107 then performs comparison and verification against the MAC value included in the data field, and notifies the verification results to the frame analyzing unit 102. The result of having obtained a MAC value by calculation, with regard to the value (linked value) obtained by linking the CAN-ID notified from the frame generating unit 110, a value of data for the data field to be transmitted, and a transmission counter value corresponding to the CAN-ID stored in the counter storing unit 109, is notified to the frame generating unit 110. AES-CMAC (RFC4493: "The AES-CMAC Algorithm") is used here as the MAC calculation method, with calculation being performed on the above-described linked value using a MAC key (session key) of a value padded to a predetermined block worth, and the four leading bytes of the obtained calculation results are taken as the MAC value. Note that the size of the MAC value, and the calculation method, are only an example, and these are not restrictive.

The session key storing unit 108 stores the session key for encryption processing relating to frames, i.e., the session key that the MAC processing unit 107 uses for calculating MAC values, in a correlated manner with the CAN-ID that the ECU 100a uses for transmission. The session key storing unit 108 saves the session key notified from the decryption processing unit 105.

The counter storing unit 109 stores counter values necessary for calculating MAC values, one each for transmission and for reception, for each CAN-ID. In a case where a frame has been successfully transmitted, the transmission counter value is incremented, and in a case where a frame has been successfully received, the reception counter value is incremented.

The frame generating unit 110 configures an error frame in accordance with the error frame transmission request notified from the frame analyzing unit 102, and notifies the frame transmission/reception unit 101 to transmit the error frame.

The frame generating unit 110 notifies the MAC processing unit 107 of the data field value decided based on the data notified from the data acquisition unit 111, and receives the MAC value calculation results. The frame generating unit 110 configures a data frame from the data field value decided based on the data notified from the data acquisition unit 111, the MAC value notified from the MAC processing unit 107, and the CAN-ID decided beforehand, and notifies the frame transmission/reception unit 101 to transmit the data frame.

The data acquisition unit 111 acquires data indicating the states of devices, sensors and the like, connected to the ECUs, and notifies the frame generating unit 110.

The ECU 100a has a function of, upon receiving frame inquiring the expiration date of a shared key, causing the frame generating unit 110 to generate an expiration date notification frame in which the expiration date is data and a MAC has been attached, and transmitting the frame. The ECU 100a and the other ECUs may have functions other than those exemplarily illustrated here. The contents of frames transmitted by each of the ECUs 100a through 100d will be described later with reference to FIGS. 10 through 13.

1.8 Reception ID List Example 2

FIG. 8 is a diagram illustrating an example of a reception ID list that the ECU 100a and ECU 100c each stores. The reception ID list illustrated in FIG. 8 is used to selectively receive and process frames of which the CAN-ID value is one of "1", "3", and so forth. Although omitted from illustration in FIG. 8, the reception ID list stored in each of the ECU 100a and ECU 100c further includes a CAN-ID decided beforehand for transmitting a session key for each ECU, and a CAN-ID decided beforehand for a shared key expiration date inquiry from the master ECU 400.

1.9 Reception ID List Example 3

FIG. 9 is a diagram illustrating an example of a reception ID list that the ECU 100b and ECU 100d each stores. The reception ID list illustrated in FIG. 9 is used to selectively receive and process frames of which the CAN-ID value is one of "2", "4", and so forth. Although omitted from illustration in FIG. 9, the reception ID list stored in each of the ECU 100b and ECU 100d further includes a CAN-ID decided beforehand for transmitting a session key for each ECU, and a CAN-ID decided beforehand for a shared key expiration date inquiry from the master ECU 400.

1.10 Example of Transmission Frame of ECU 100a Relating to Engine

FIG. 10 is a diagram illustrating an example of a CAN-ID and data field (data) in frames transmitted from the ECU 100a connected to the engine 310. The CAN-ID of the frames that the ECU 100a transmits relating to speed is "1". In the value in the data field, the first one byte represents speed, the next one byte represents the counter (transmission counter value), and the next four bytes represent the MAC value. The speed (km/hour) assumes a range from a minimum of 0 (km/hour) to a maximum of 180 (km/hour). In order from the top row to lower rows in FIG. 10 is illustrated the CAN-IDs and data corresponding to the frames sequentially transmitted from the ECU 100a, representing the way in which acceleration is performed from 0 km/hour in 1 km/hour increments.

1.11 Example of Transmission Frame of ECU 100b Relating to Brakes

FIG. 11 is a diagram illustrating an example of a CAN-ID and data field (data) in frames transmitted from the ECU 100b connected to the brakes 320. The CAN-ID of the frames that the ECU 100b transmits relating to the degree of braking is "2". In the value in the data field, the first one byte represents the degree of braking, the next one byte represents the counter (transmission counter value), and the next four bytes represent the MAC value. The degree of braking is represented by percentage (%), with a state where no braking is being performed at all being 0(%), and a state of full-braking is 100(%). In order from the top row to lower rows in FIG. 11 is illustrated the CAN-IDs and data corresponding to the frames sequentially transmitted from the ECU 100b, representing the way in which braking is gradually being reduced from 100%.

1.12 Example of Transmission Frame of ECU 100c Relating to Door Opened/Closed Sensor FIG. 12 is a diagram illustrating an example of a CAN-ID and data field (data) in frames transmitted from the ECU 100c connected to the door open/closed sensor 330. The CAN-ID of the frames that the ECU 100c transmits relating to the open/closed state of the door is "3". In the value in the data field, the first one byte represents the open/closed state of the door, the next one byte represents the counter (transmission counter value), and the next four bytes represent the MAC value. The open/closed state of the door is represented by "1" for a state where the door is opened, and "0" for a state where the door is closed. In order from the top row to lower rows in FIG. 12 is illustrated the CAN-IDs and data corresponding to the frames sequentially transmitted from the ECU 100c, representing the way in which the door transitions from an open state to a closed state.

1.13 Example of Transmission Frame of ECU 100d Relating to Window Opened/Closed Sensor FIG. 13 is a diagram illustrating an example of a CAN-ID and data field (data) in frames transmitted from the ECU 100d connected to the window open/closed sensor 340. The CAN-ID of the frames that the ECU 100d transmits relating to the open/closed state of the window is "4". In the value in the data field, the first one byte represents the open/closed state of the window, the next one byte represents the counter (transmission counter value), and the next four bytes represent the MAC value. The open/closed state of the window is represented by percentage (%), with a state where the window is completely closed being 0(%), and a state where the window is completely open being 100(%). In order from the top row to lower rows in FIG. 13 is illustrated the CAN-IDs and data corresponding to the frames sequentially transmitted from the ECU 100d, representing the way in which the window is gradually transitioning from a closed state to an open state.

1.14 Shared Key that ECU 100a Stores

FIG. 14 is a diagram illustrating the shared key that the ECU 100a stores, and information indicating the expiration date thereof. FIG. 14 indicates that a shared key "0x1A4DE4FC02F66B77" having the expiration date of "2034 Dec. 31" has been assigned to the CAN-ID "1" that the ECU 100a transmits. This shared key is used for decoding the session key transmitted from the master ECU 400. Note that the shared key may be set to the ECU at the stage of manufacturing or shipping or the like of the ECU, and updated by connecting a dedicated tool to the onboard network system 10.

1.15 Session Key Distribution Sequence

Figure 15:
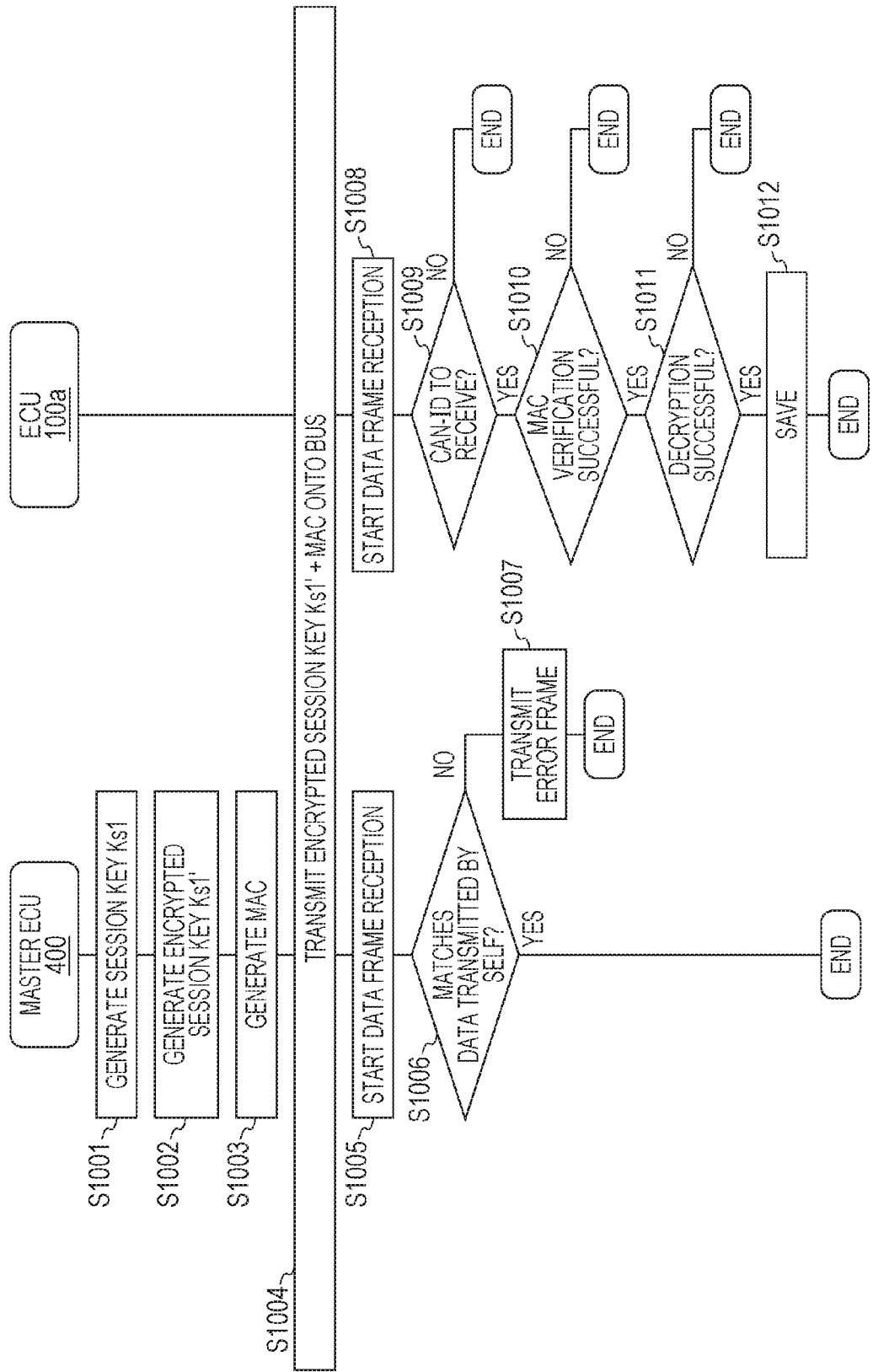
FIG. 15 is a diagram illustrating an example of a session key distribution sequence between the master ECU (key managing device) and ECUs.

The following is a description of operations of the master ECU 400 transmitting a session key to the ECU 100a, with reference to FIG. 15. FIG. 15 is a diagram illustrating an example of a session key distribution sequence performed between the master ECU 400 and the ECU 100a. Although the master ECU 400 distributes session keys to the ECUs 100b through 100d in the same way, description will be made here focusing on the ECU 100a that is the ECU that transmits frames with the CAN-ID "1".

First, the master ECU 400 generates a certain session key Ks1 at the session key generating unit 411 (step S1001).

Next, the master ECU 400 uses the shared key Km (see FIG. 5) corresponding to the CAN-ID "1" to encrypt the session key Ks1 and generate an encrypted session key Ks1' at the encryption processing unit 409 (step S1002).

The master ECU 400 generates a MAC using the generated encrypted session key Ks1' and a counter (transmission counter value) at the MAC processing unit 406 (step S1003).

The master ECU 400 transmits a data frame including in the data field the encrypted session key Ks1' and the MAC value, to which has been attached the CAN-ID decided beforehand for transmission of the session key to the ECU 100a corresponding to the CAN-ID "1" (step S1004). Accordingly, the data frame appears on the bus 200.

The master ECU 400 starts receiving the data frame flowing on the bus to confirm the transmitted frame (step S1005), confirms that the data flowing on the bus matches the data frame which it is transmitting itself (step S1006), and if not matching, transmits an error frame (step S1007).

When a data frame appears on the bus 200, the ECU 100a starts receiving the data frame flowing on the bus (step S1008).

The ECU 100a receives the CAN-ID included in the data frame flowing on the bus at the reception ID judging unit 103, and checks whether or not it is an ID listed in the reception ID list that the reception ID list storing unit 104 stores (step S1009). In a case where the CAN-ID is a CAN-ID that is not listed in the reception ID list, the data frame being received is discarded, and the frame reception ends. Note that the CAN-ID decided beforehand for session key transmission is listed in the reception ID list.

The ECU 100a extracts the MAC value from the data field of the received data frame and performs verification at the MAC processing unit 107 (step S1010). In a case where verification fails, the data frame being received is discarded, and the frame reception ends.

The ECU 100a acquires the encrypted session key Ks1 from the received data field, and extracts the session key Ks1 by performing decryption processing at the decryption processing unit 105 using the shared key that the shared key list storing unit 106 stores (step S1011). In a case where decryption fails, processing regarding the received frame ends.

The ECU 100a saves the extracted session key Ks1 in the session key storing unit 108 (step S1012). The ECU 100a uses this session key Ks1 to generate or verify MAC values at the time of transmission or reception of the next and subsequent data frames.

The ECUs 100b through 100d can each use a shared key shared with the master ECU 400 so as to acquire the session key Ks1 from the master ECU 400 in the same way as the ECU 100a.

1.16 Message Authentication Sequence

Figure 16:
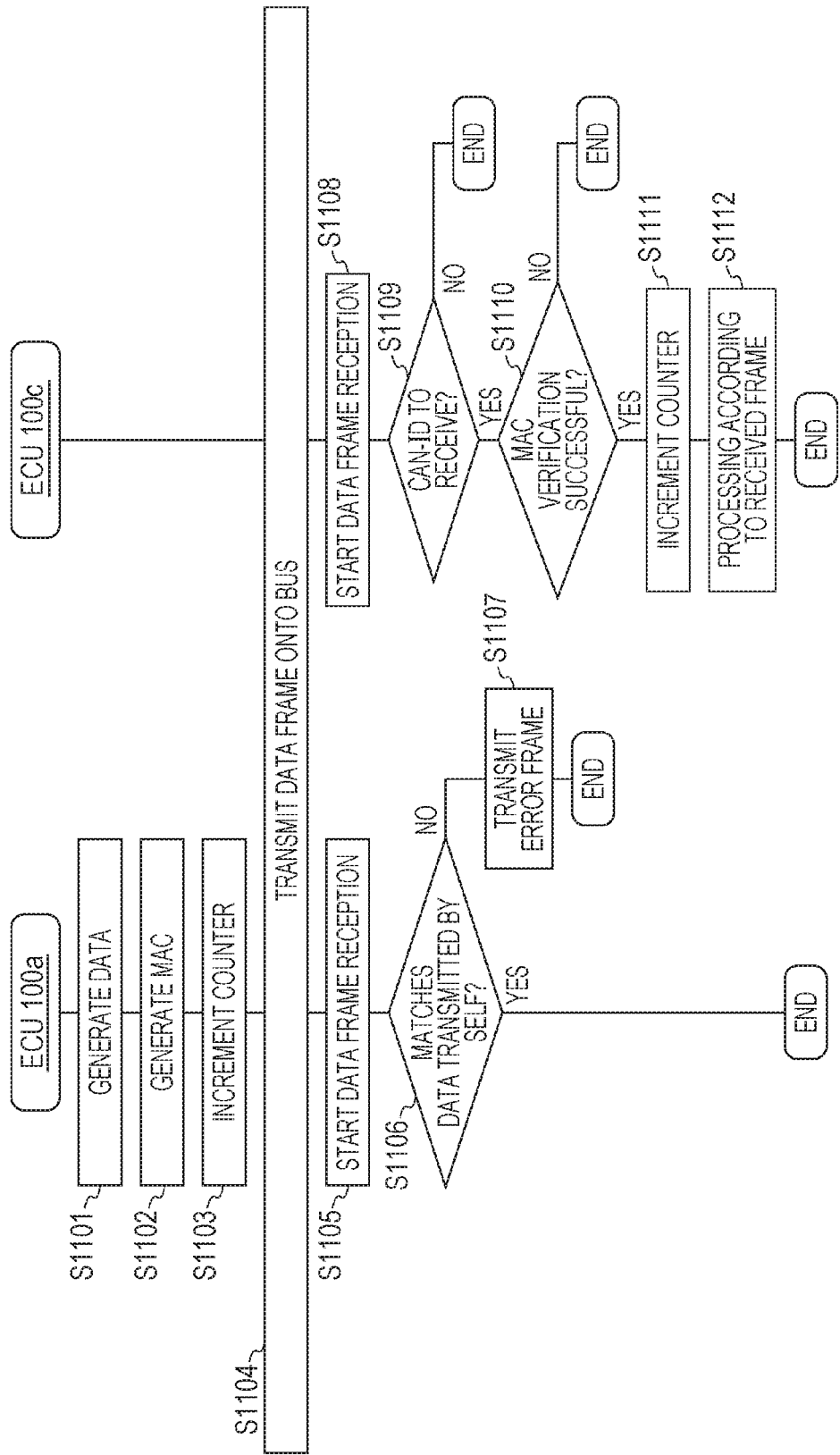
FIG. 16 is a diagram illustrating an example of a message authentication sequence among ECUs.

The following is a description of operations of message authentication relating to transmission of a data frame between the ECU 100a and the ECU 100c, with reference to FIG. 16.

FIG. 16 is a diagram illustrating an example of a message authentication sequence performed between the ECU 100a and ECU 100c. Although message authentication between the ECU 100a and the ECU 100c is illustrated here, the same operations are performed between other ECUs, between the ECU 100b and ECU 100d for example, between the ECU 100a and the master ECU 400, and so forth. The ECU 100c has basically the same configuration as the ECU 100a, so components of the ECU 100c will be reference using the same reference numerals as for the components of the ECU 100a (See FIG. 7).

First, the ECU 100a generates data to be transmitted at the frame generating unit 110 (step S1101).

The ECU 100a then generates a MAC corresponding to the value of the data generated in step S1101 and the counter (transmission counter value) at the MAC processing unit 107 (step S1102). The ECU 100a uses the session key Ks1 stored in the session key storing unit 108 to generate this MAC.

Next, the ECU 100a increments the transmission counter value corresponding top the CAN-ID "1" by 1 (step S1103).

The ECU 100a transmits the data frame including the value of the data and the counter in the data field, with the CAN-ID "1" attached, by the frame transmission/reception unit 101 (step S1104). Accordingly, the data frame appears on the bus 200.

The ECU 100a starts receiving the data frame flowing on the bus to confirm the transmitted frame (step S1105), confirms that the data flowing on the bus matches the data frame which it is transmitting itself (step S1106), and if not matching, transmits an error frame (step S1107).

When a data frame appears on the bus 200, the ECU 100c starts receiving the data frame flowing on the bus (step S1108).

The ECU 100c receives the CAN-ID included in the data frame flowing on the bus at the reception ID judging unit 103, and checks whether or not it is an ID listed in the reception ID list (see FIG. 8) that the reception ID list storing unit 104 stores (step S1109). In a case where the CAN-ID is a CAN-ID that is not listed in the reception ID list, the data frame being received is discarded, and the frame reception ends.

The ECU 100c extracts the MAC value from the data field of the received data frame and performs verification at the MAC processing unit 107 (step S1110). In a case where verification fails, the data frame being received is discarded, and the frame reception ends. The ECU 100c uses the session key Ks1 stored at the session key storing unit 108 in the verification of the MAC in step S1110. In a case where verification has been successful, the ECU 100c increments the reception counter value corresponding to the CAN-ID "1" by 1 (step S1111).

Following step S1111, the ECU 100c performs processing in accordance with the received data frame (step S1112).

1.17 Shared Key Verification Sequence

Figure 17:
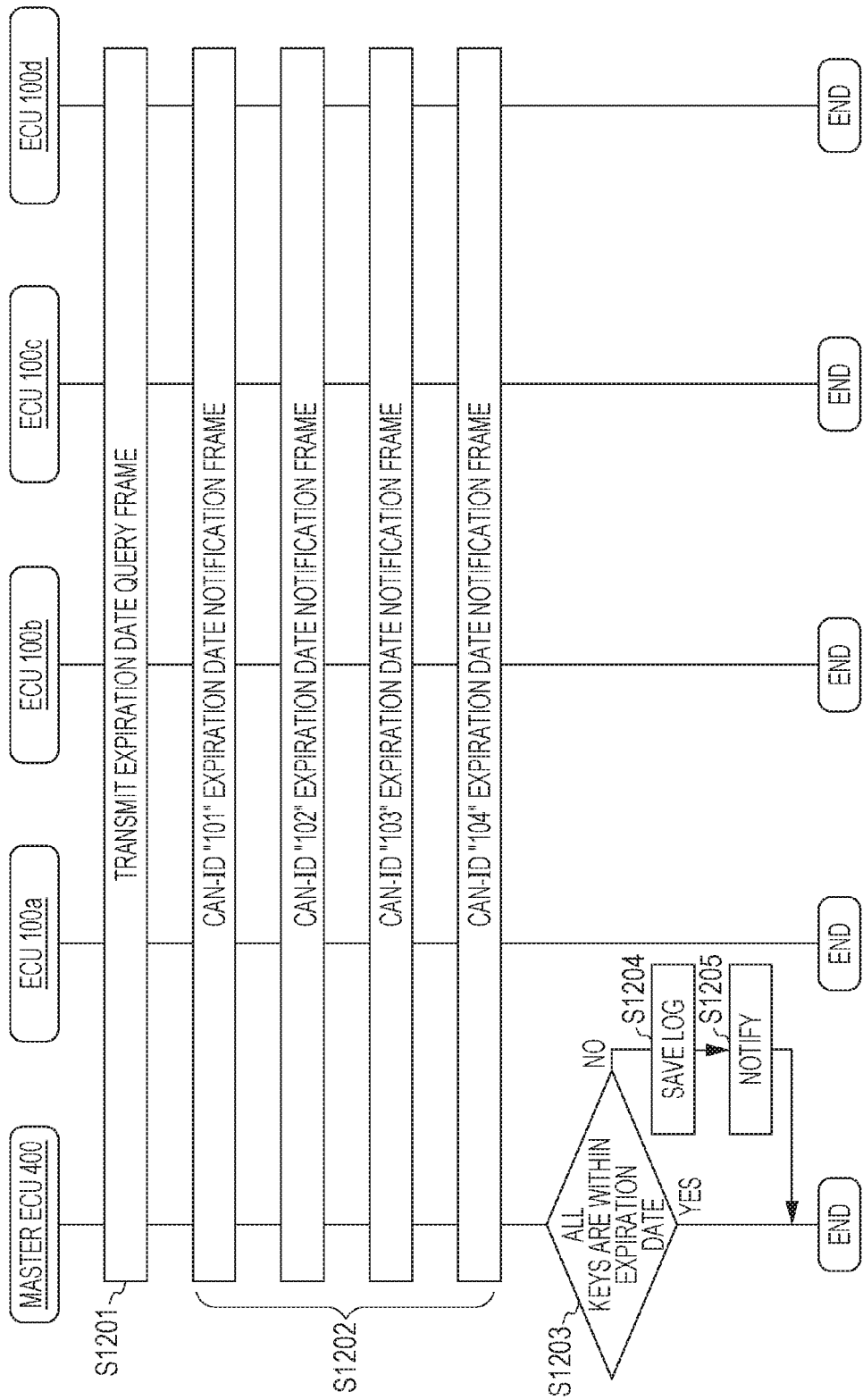
FIG. 17 is a diagram illustrating an example of a shared key verification sequence between the master ECU (key managing device) according to the first embodiment and ECUs.

The following is a description of operations of the master ECU 400 inspecting (verifying) the security state relating to shared keys, by confirmation of the expiration date, with reference to FIG. 17.

FIG. 17 illustrates an example of a shared key verification sequence by the master ECU 400, the ECU 100a, the ECU 100b, the ECU 100c, and the ECU 100d. Note that this shared key verification sequence is executed when the vehicle in which is installed the onboard network system 10 is in a particular state (e.g., a stopped state before driving), for example. As for a specific example, this is executed immediately after entering the accessory-on (ACC-ON) state.

The master ECU 400 transmits an expiration date inquiry frame regarding the shared keys that the ECUs store shared with the master ECU 400 (step S1201). Accordingly, an expiration date inquiry frame appears on the bus 200.

The ECUs 100a through 100d each receive the expiration date inquiry frame from the bus 200, and transmit an expiration date notification frame including data, where the MAC has been attached to the expiration date of the shared key that each store, in the data field (step S1202). That is to say, the ECU 100a, the ECU 100b, the ECU 100c, and the ECU 100d transmit expiration date notification frames to which the respective CAN-IDs "101", "102", "103", and "104", have been attached. Accordingly, the expiration date notification frames sequentially appear on the bus 200.

The master ECU 400 verifies the MAC values included in the expiration date notification frames sequentially appearing on the bus 200, and compares the expiration date included in the expiration date notification frames with the current point-in-time, thereby confirming that the expiration date of the shared keys obtained from all ECUs is later than the current point-in-time (i.e., that all of the shared keys are within the expiration date) (step S1203). If there is a shared key that is not within the expiration date, the master ECU 400 records and saves information indicating that the expiration date has elapsed in a log (step S1204), and displays information on the display device relating to the fact that the expiration date has elapsed (information indicating that updating of the shared key is necessary and so forth), thus making notification to the driver (step S1205). Note that in a case where the expiration date of any one of the shared keys has elapsed, for example, the master ECU 400 can keep session keys from being transmitted.

1.18 Advantages of First Embodiment

In the onboard network system 10 according to the first embodiment, the master ECU 400 (a first-type ECU serving as a key managing device so as to speak) confirms (inspects) the expiration date of the shared keys that the ECUs (second-type ECU) store, in a case where the vehicle is in a particular state, such as a stopped state, thereby inspecting whether or not the risk of leakage of the shared keys that the ECUs store has increased (whether or not a state where updating of the shared key is necessary) with regard to security. That is to say, a first-type ECU receives a frame including information indicating the expiration date of a shared key that a second-type ECU stores and distinguishes whether or not the expiration date has already elapsed, thereby inspecting the security state of the shared key, and performs communication to give the second-type ECU a session key in a case where the expiration date has not expired, while performing control such as notification or the like (display on the display device or the like) in a case where the expiration date has elapsed. The shared keys that the ECUs (second-type ECU) store are shared between the ECUs and the master ECU (first-type ECU), and are used for transmission of session keys. The session keys are used as keys in encryption processing (processing including generating and verifying MACs, etc.) when transmitting and receiving frames among the ECUs. This encryption processing may include various types of conversion processing, such as encryption, decryption, signing, verification, and so forth. Accordingly, in a case where the security state is unsuitable (in a case where the risk of leakage of a shared key is higher) in the onboard network system 10 where the security state of shared keys is configured using the expiration date, safety can be secured by notification, recording in a log, and so forth, and thereby can prevent distribution of invalid session keys. Performing the shared key security state inspection in a stopped state before the vehicle drives, such as at the time of ACC-ON, and avoiding increased processing load on the ECUs and increased traffic on the bus 200 while the vehicle is driving, is useful.

1.19 Modification of First Embodiment

The onboard network system 10 including a master ECU 1400 (key managing device) which is a partial modification of the above-described master ECU 400 will be described below.

The master ECU 1400 is basically the same as the master ECU 400, but the method of verifying the expiration date of the shared keys that the ECUs store differs. That is to say, the master ECU 1400 has a function of verifying the expiration date of the shared keys that the ECUs store by communication with a server that is external from the onboard network system 10 (outside of the vehicle).

1.20 Configuration of Master ECU 1400

Figure 18:
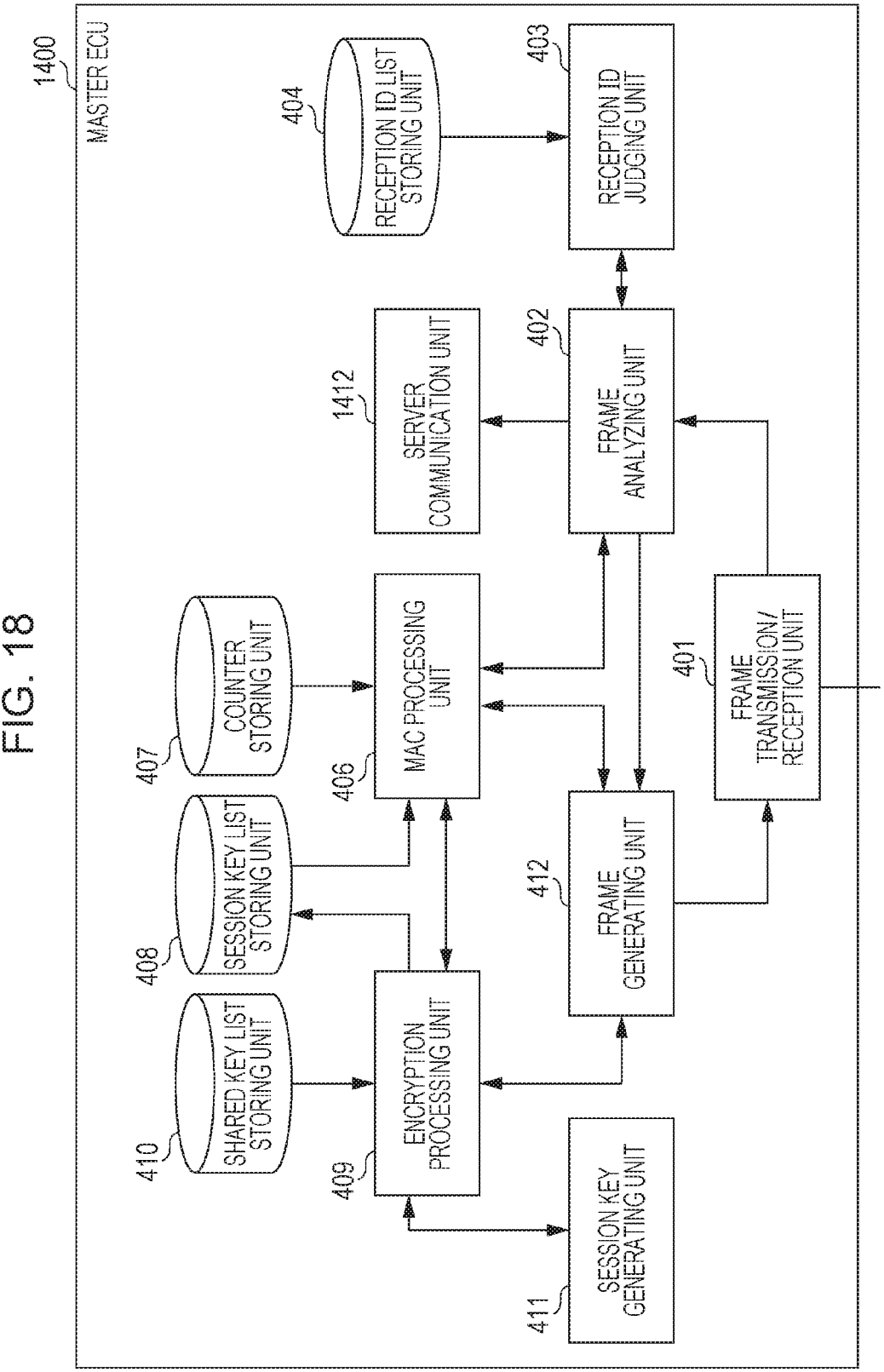
FIG. 18 is a configuration diagram of a master ECU (key managing device) according to the first embodiment.

FIG. 18 is a configuration diagram of the master ECU 1400. The master ECU 1400 includes the frame transmission/reception unit 401, the frame analyzing unit 402, the reception ID judging unit 403, the reception ID list storing unit 404, the MAC processing unit 406, the counter storing unit 407, the session key list storing unit 408, the encryption processing unit 409, the shared key list storing unit 410, the session key generating unit 411, the frame generating unit 412, and a server communication unit 1412. These components are functional components, and the functions thereof are realized by a communication circuit in the master ECU 1400, a processor or digital circuit of the like that executes the control program stored in the memory, and so forth. Note that the components of the master ECU 1400 that are the same as the components of the master ECU 400 (see FIG. 3) are denoted by the same reference numerals, and description will be omitted as appropriate.

In a case of having succeeded in verification, as the result of verifying a MAC of a data frame at the MAC processing unit 406, the frame analyzing unit 402 notifies the server communication unit 1412 of the CAN-ID of the frame and the value of the data field.

The server communication unit 1412 has a function of communicating with an external server wirelessly. The server communication unit 1412 correlates the CAN-IDs of all data frames received from the frame analyzing unit 402 and the values of the data fields, notifies the server, and receives determination results from the server. In a case where an error occurs as a result of determination, the driver is notified by displaying the content of the error on the display device, for example. In a case where the determination results at the server regarding an expiration date notification frame are an error, the master ECU 1400 can keep transmission of session keys to the ECUs from being performed.

Note that the external server is a computer communicable with the master ECU 1400, and has a function of, in a case of having received from the master ECU 1400 a CAN-ID regarding an expiration date notification frame and a value indicating the expiration date that is the value of the data field, making judgment regarding whether or not the expiration date has elapsed, based on the current point-in-time or other information. In a case where this has not elapsed, a determination result of normal is transmitted to the master ECU 1400, and if this has elapsed, an error is transmitted.

1.21 Shared Key Verification Sequence

Figure 19:
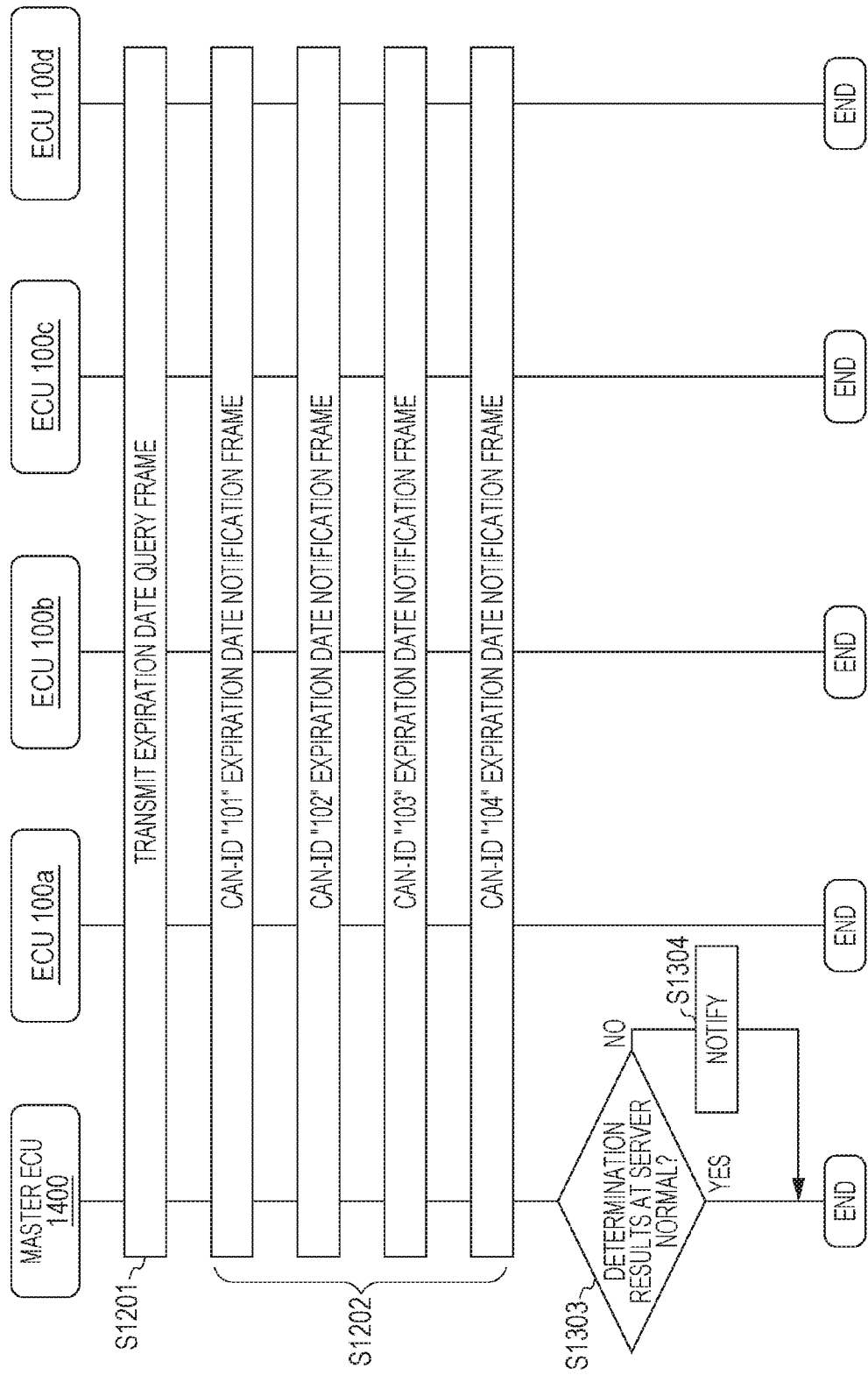
FIG. 19 is a diagram illustrating an example of a shared key verification sequence between the master ECU (key managing device) according to a modification of the first embodiment and ECUs.

The following is a description of operations of the master ECU 1400 inspecting the security state relating to shared keys, by communication with the server, with reference to FIG. 19.

FIG. 19 illustrates an example of a shared key verification sequence by the master ECU 1400, the ECU 100a, the ECU 100b, the ECU 100c, and the ECU 100d. Note that this shared key verification sequence is executed when the vehicle in which is installed the onboard network system 10 is in a particular state (e.g., a stopped state before driving), for example. As for a specific example, this is executed immediately after entering the accessory-on (ACC-ON) state. Note that processing (steps) in FIG. 19 that are the same as those shown in FIG. 17 are denoted by the same reference numerals, and description will be omitted here.

In step S1202, expiration date notification frames transmitted by the ECU 100a, ECU 100b, ECU 100c, and ECU 100d sequentially appear on the bus 200.

The master ECU 1400 transmits to the server the CAN-IDs of the expiration date notification frames sequentially appearing on the bus 200 and the values included in the expiration date notification frames. Confirmation is made regarding whether or not the expiration date of the shared keys has not elapsed, by whether or not the determination results returned from the server are normal (step S1303). In a case where the determination results form the server are an error, i.e., the expiration date of the shared key has expired, the master ECU 1400 notifies the drive by display information relating to the fact that the expiration date has expired (information indicating that the updating of the shared key is necessary, etc.) on the display device (step S1304). Note that in a case where the expiration date of any one of the shared keys has elapsed, for example, the master ECU 1400 can keep session keys from being transmitted.

1.22 Advantages of Modification of First Embodiment

In the onboard network system 10 according to the modification of the first embodiment, the master ECU 1400 communicates with an external server in a case where the vehicle is in a particular state such as a stopped state or the like, and causes the server to determine the expiration date of shared keys that the ECUs store, thereby verifying whether or not the security state of the shared keys is appropriate, i.e., whether or not the state is that where the risk of leakage of shared keys stored by the ECUs is higher (whether or not a state where the shared keys need to be updated). In a case where the security state is inappropriate, safety can be secured by notification and the like, and distribution of unauthorized session keys can be prevented. The external server can collect information of the expiration date of the shared keys of the ECUs from the master ECU 400 in the onboard network system 10 installed in each of multiple vehicles and confirm the integrity, so the security state of the shared keys can be determined more appropriately.

Second Embodiment

As an embodiment of the present disclosure, an onboard network system will be described including a master ECU (key managing device) 20400 that saves a shared key list, which is information correlating CAN-IDs and serial IDs for each ECU, and verifies the security state of the shared keys based on the shared key list. The onboard network system according to the present embodiment has the master ECU 400 in the onboard network system 10 according to the first embodiment (see FIG. 1) replaced with the master ECU 20400 (described later). The onboard network system according to the present embodiment has the ECU 100a in the onboard network system 10 according to the first embodiment replaced with a ECU 20100a (described later) having a function of storing a serial ID unique to the ECU and transmitting a serial ID notification frame to make notification of this serial ID. The onboard network system according to the present embodiment also has ECUs 20100b through 20100d having the same function as the ECU 20100a, instead of the ECUs 100b through 100d.

2.1 Configuration of Master ECU 20400

In the same way as the master ECU 400, the master ECU 20400 is connected to the bus 200, as a type of ECU serving as a key managing device. The master ECU 20400 stores a shared key shared with one or more ECUs out of the multiple ECUs connected to the bus 200 besides itself, to use for transmitting session keys mutually between the one or more ECUs for encryption processing relating to frames (including MAC processing), and functions to manage the security state of the shared key.

Figure 20:
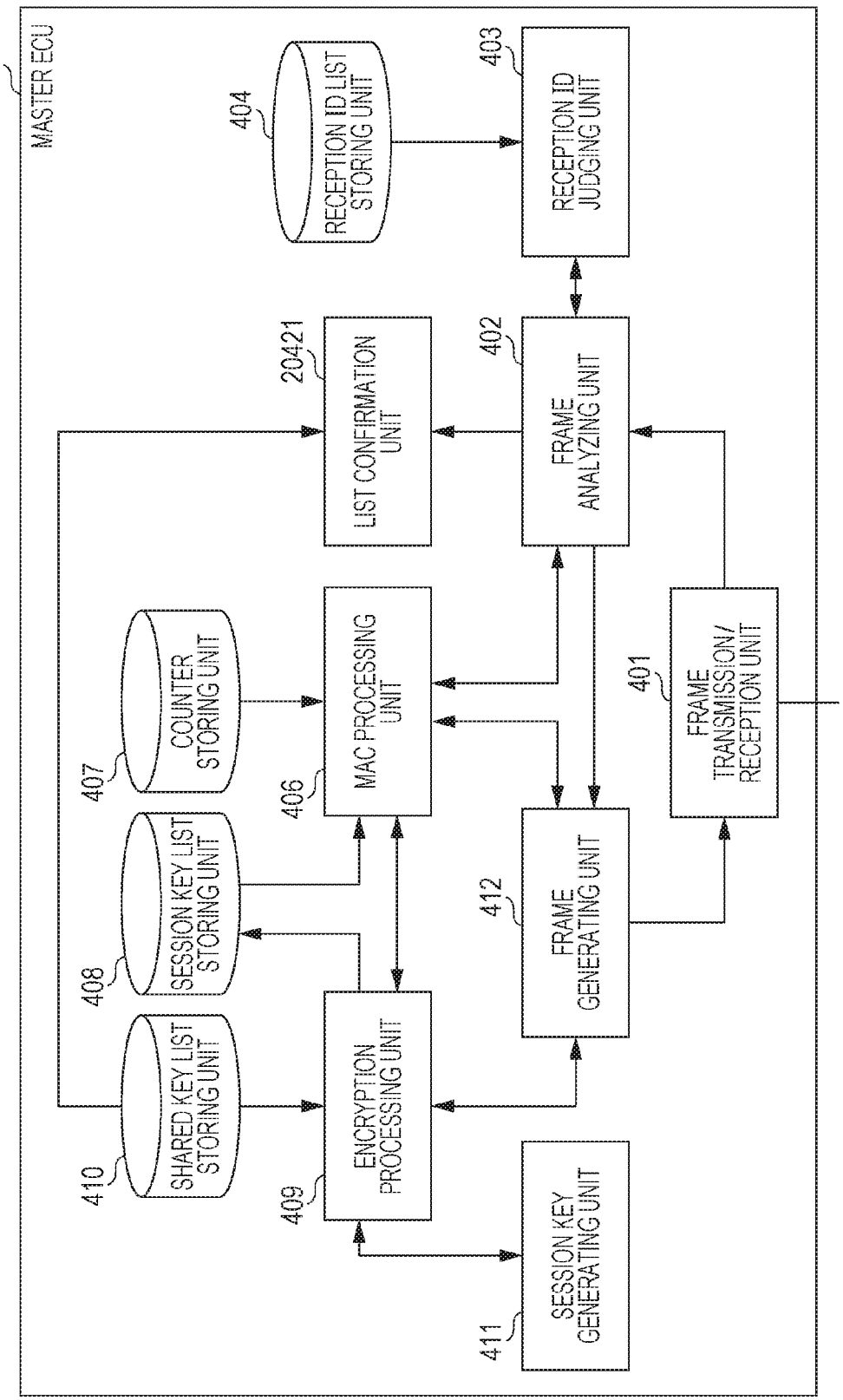
FIG. 20 is a configuration diagram of a master ECU (key managing device) according to a second embodiment.

FIG. 20 is a configuration diagram of the master ECU 20400. The master ECU 20400 includes the frame transmission/reception unit 401, the frame analyzing unit 402, the reception ID judging unit 403, the reception ID list storing unit 404, the MAC processing unit 406, the counter storing unit 407, the session key list storing unit 408, the encryption processing unit 409, a shared key list storing unit 20410, the session key generating unit 411, the frame generating unit 412, and a list confirmation unit 20421. Note that the components that are the same as those shown in the first embodiment are denoted by the same reference numerals, and description will be omitted as appropriate.

The shared key list storing unit 20410 stores a shared key list that is a list correlating shared keys shared beforehand for use in transmission of session keys among the ECUs, with the CAN-IDs, and further correlating serial IDs for each ECU. For each CAN-ID, there are designated the serial ID of one ECU that transmits a frame with that CAN-ID, and one corresponding shared key. Besides designating a shared key for each CAN-ID, one shared key may be designated for all ECUs or multiple ECUs. In this case, multiple serial IDs correspond to a single shared key. Alternatively, in a case where the bus 200 is of a configuration where multiple sub-nets are connected by a gateway, the bus 200 may designate one shared key for each sub-net (each set of ECUs connected to a sub-net). FIG. 21 illustrates an example of a shared key list that the shared key list storing unit 20410 stores.

In a case of having succeeded in verification as a result of the verification of the MAC of the data frame in the MAC processing unit 406, the frame analyzing unit 402 notifies the list confirmation unit 20421 of the CAN-ID of that data frame and the value of the data field.

The list confirmation unit 20421 acquires a value indicating a serial ID unique to the ECU that is the transmission source of the frame at the frame analyzing unit 402, the value being a value of the data field of a serial ID notification frame identified by the CAN-ID, and compares with the serial ID in the shared key list that the shared key list storing unit 410 stores, to determine whether matching or not. In a case where the serial IDs do not match, the list confirmation unit 20421 performs error processing, of recording in a log or the like. Another example of error processing besides recording in a log include displaying information relating to the error on the display device, thereby notifying the driver, not performing transmission of session keys to the ECUs, and so forth.

Note that the reception ID list that the reception ID list storing unit 404 stores has listed the CAN-IDs "201", "202", "203", and "204", of the serial ID notification frames that the ECUs 20100*a* through 20100*d* transmit, instead of the CAN-IDs "101", "102", "103", and "104". Of the expiration date notification frames illustrated in the first embodiment. In the example of the CAN-IDs used here, the CAN-IDs "201", "202", "203", and "204" of serial ID notification frames that the ECUs transmit are values obtained by adding a certain values to the CAN-IDs "1", "2", "3", and "4" that these ECUs basically transmit.

2.2 Shared Key List Example

FIG. 21 is a diagram illustrating an example of a shared key list that the master ECU 20400 stores in the shared key list storing unit 20410. The shared key list is a list where CAN-IDs and shared keys (Km) and serial IDs are correlated. The serial ID is an ID unique to each ECU. The manufacture or the like of the ECUs, for example, gives the ECUs individual serial IDs. The shared key list illustrated in FIG. 21 indicates that shared key "0x1A4DE4FC02F66B77" and serial ID "0x10000001" have been assigned to CAN-ID "1", shared key "0x27AB6EAC81773F65" and serial ID "0x10000002" have been assigned to CAN-ID "2", shared key "0xCB939EA0CE378A7E" and serial ID "0x10000003" have been assigned to CAN-ID "3", and shared key "0x03E46FF28CBC8D7A" and serial ID "0x10000004" have been assigned to CAN-ID "4".

2.3 Configuration of ECU 20100*a*

Figure 22:
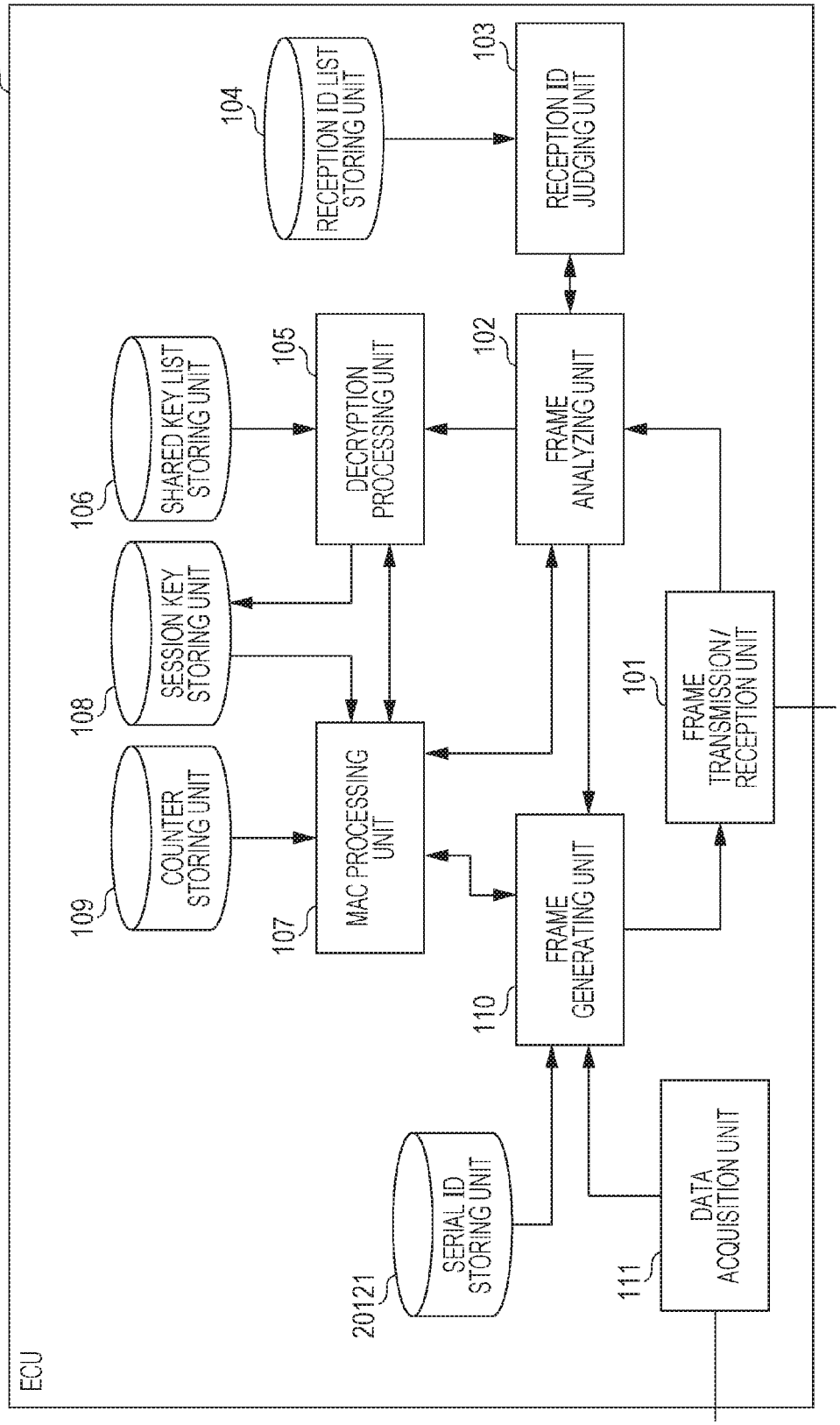
FIG. 22 is a configuration diagram of an ECU according to the second embodiment.

FIG. 22 is a configuration diagram of the ECU 20100*a*. The ECU 20100*a* is configured including the frame transmission/reception unit 101, the frame analyzing unit 102, the reception ID judging unit 103, the reception ID list storing unit 104, the decryption processing unit 105, the shared key list storing unit 106, the MAC processing unit 107, the session key storing unit 108, the counter storing unit 109, the frame generating unit 110, the data acquisition unit 111, and a serial ID storing unit 20121. These components are functional components, and the functions thereof are realized by a communication circuit in the ECU 20100*a*, a processor or digital circuit of the like that executes the control program stored in the memory, and so forth. The ECUs 20100*b* through 20100*d* also have basically the same configuration as the ECU 20100*a*. Components of the ECU 20100*a* that are the same as the components of the ECU 100*a* (see FIG. 7) will be denoted with the same reference numerals, and description will be omitted here.

The serial ID storing unit 20121 stores a serial ID that is an ID unique to the ECU 20100*a*.

The frame generating unit 110 acquires a serial ID that the serial ID storing unit 20121 stores when generating a serial ID notification frame. The frame generating unit 110 generates a serial ID notification frame including the acquired serial ID and a MAC value generated by the MAC processing unit 107 corresponding to that serial ID, in the data field.

The ECU 20100*a* has a function of causing the frame generating unit 110 to generate a serial ID notification frame, and of transmitting the serial ID notification frame, in a case where a serial ID inquiry frame has been received from the master ECU 20400.

2.4 Shared Key Verification Sequence

Figure 23:
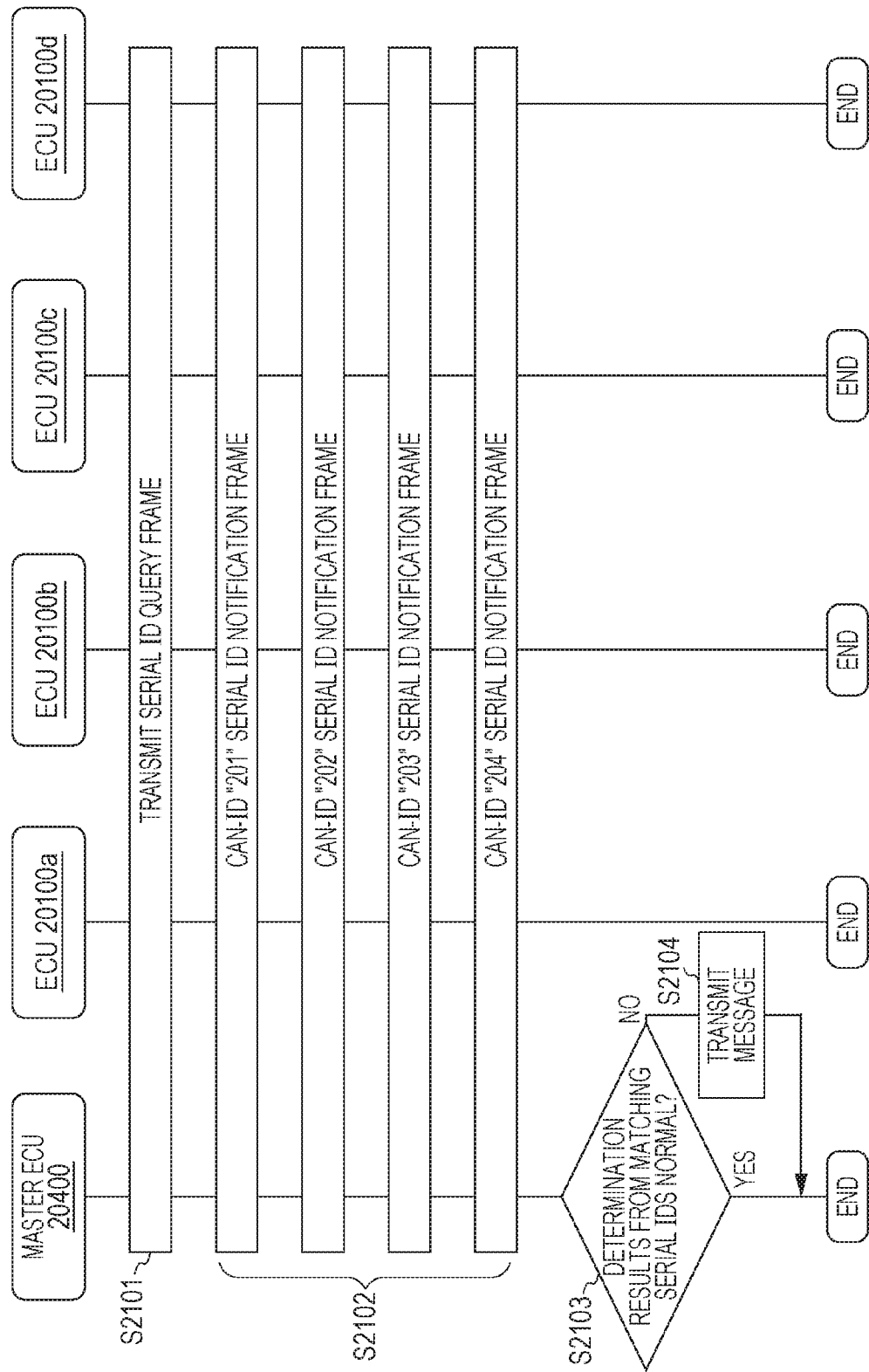
FIG. 23 is a diagram illustrating an example of a shared key verification sequence between the master ECU (key managing device) according to the second embodiment and ECUs.

The following is a description of operations of the master ECU 20400 inspecting the security state relating to shared keys, by confirmation of the serial ID, with reference to FIG. 23.

FIG. 23 illustrates an example of a shared key verification sequence by the master ECU 20400, the ECU 20100*a*, the ECU 20100*b*, the ECU 20100*c*, and the ECU 20100*d*. Note that this shared key verification sequence is executed when the vehicle in which is installed the onboard network system 10 is in a particular state (e.g., a stopped state before driving), for example. As for a specific example, this is executed immediately after entering the accessory-on (ACC-ON) state.

The master ECU 20400 transmits a frame for inquiry of serial IDs that the ECUs have (step S2101). Thus, the serial ID inquiry frame appears on the bus 200.

The ECUs 20100*a* through 20100*d* each receive the serial ID inquiry frame from the bus 200, and transmit a serial ID notification frame including data in the data field where a MAC has been attached to the serial ID that each stores (step S2102). That is to say, the ECU 20100*a*, ECU 20100*b*, ECU 20100*c*, and ECU 20100*d* respectively transmit serial ID notification frames to which are attached CAN-IDs "201", "202", "203", "204". Thus, the serial ID notification frames sequentially appear on the bus 200.

With regard to the serial ID notification frames sequentially appearing on the bus 200, the master ECU 20400 verifies the MAC value included in each serial ID notification frame, and matches the serial ID included in the serial ID notification frame with the serial ID in the shared key list stored in the shared key list storing unit 20410, thereby determining whether or not the correlation between the shared key and serial ID has been changed (step S2103). Specifically, in a case where the CAN-ID of the serial ID notification frame is "201" for example, the CAN-ID "1" identified by subtracting or the like a particular value corresponding to the "201", and the corresponding serial ID in the shared key list, are identified, the serial ID and the serial ID included in the serial ID notification frame are compared, and if the serial IDs match (the correlation between the shared key and serial ID has not been changed), determination is made that the state is normal. If these do not match, determination is made that this is an error.

In a case where the results of the determination in step S2103 are not normal, the master ECU 20400 transmits a message (frame) notifying an error (step S2104). When a message notifying an error is flowing on the bus 200, a particular ECU receives this, and the particular ECU performs error notification (generating a sound indicating an error, an error display, lighting an error lamp, etc.). Note that the master ECU 20400 may transmit a message and relegate error processing to another ECU, or may display the error on the display device, may save information relating to the error in a log, and may notify an external server of the error. In a case where determination is made of an error, the master ECU 20400 may keep session keys from being transmitted.

2.5 Advantages of Second Embodiment

In the onboard network system according to the second embodiment, the master ECU 20400 (a first-type ECU serving as a key managing device so as to speak) confirms (inspects) the serial ID of the shared keys that the ECUs (second-type ECU) store, in a case where the vehicle is in a particular state, such as a stopped state, and confirm that an ECU with an unauthorizedly copied shared key or the like has not been added. Accordingly, confirming the serial ID enables verification of the security state of the shared keys, i.e., enables confirmation of whether or not the risk of leakage of the shared keys that the ECUs store has increased. That is to say, a first-type ECU receives a frame including information indicating the serial ID from a second-type ECU, and distinguishes whether or not the security state of the shared key is suitable based on the serial ID and predetermined matching information stored beforehand (e.g., a shared key list), and performs communication to give the second-type ECU a session key in a case where the security state of the shared key is suitable, while performing control such as notification or the like in a case where the security state of the shared key is not suitable. Performing the shared key security state inspection in a stopped state before the vehicle drives, such as at the time of ACC-ON, and avoiding increased processing load on the ECUs and increased traffic on the bus 200 while the vehicle is driving, is useful. As for a method of the first-type ECU distinguishing whether or not the security state of the shared key is suitable based on the serial ID received from the second-type ECU and the matching information (shared key list or the like), the serial ID may be directly compared with the matching information to distinguish whether matching or not, or the result of having performed predetermined computation on the serial ID may be compared with the matching information.

2.6 Modification of Second Embodiment

The onboard network system including a master ECU 21400 (key managing device) which is a partial modification of the above-described master ECU 20400 will be described below. The master ECU 21400 is basically the same as the master ECU 20400, but the method of verifying the serial ID that the ECUs store differs. That is to say, the master ECU 1400 has a function of verifying the serial IDs of the ECUs by communication with a server that is external from the onboard network system (outside of the vehicle). This server is a computer that manages information correlating CAN-IDs and the serial IDs of each of the ECUs.

2.7 Configuration of Master ECU 21400

Figure 24:
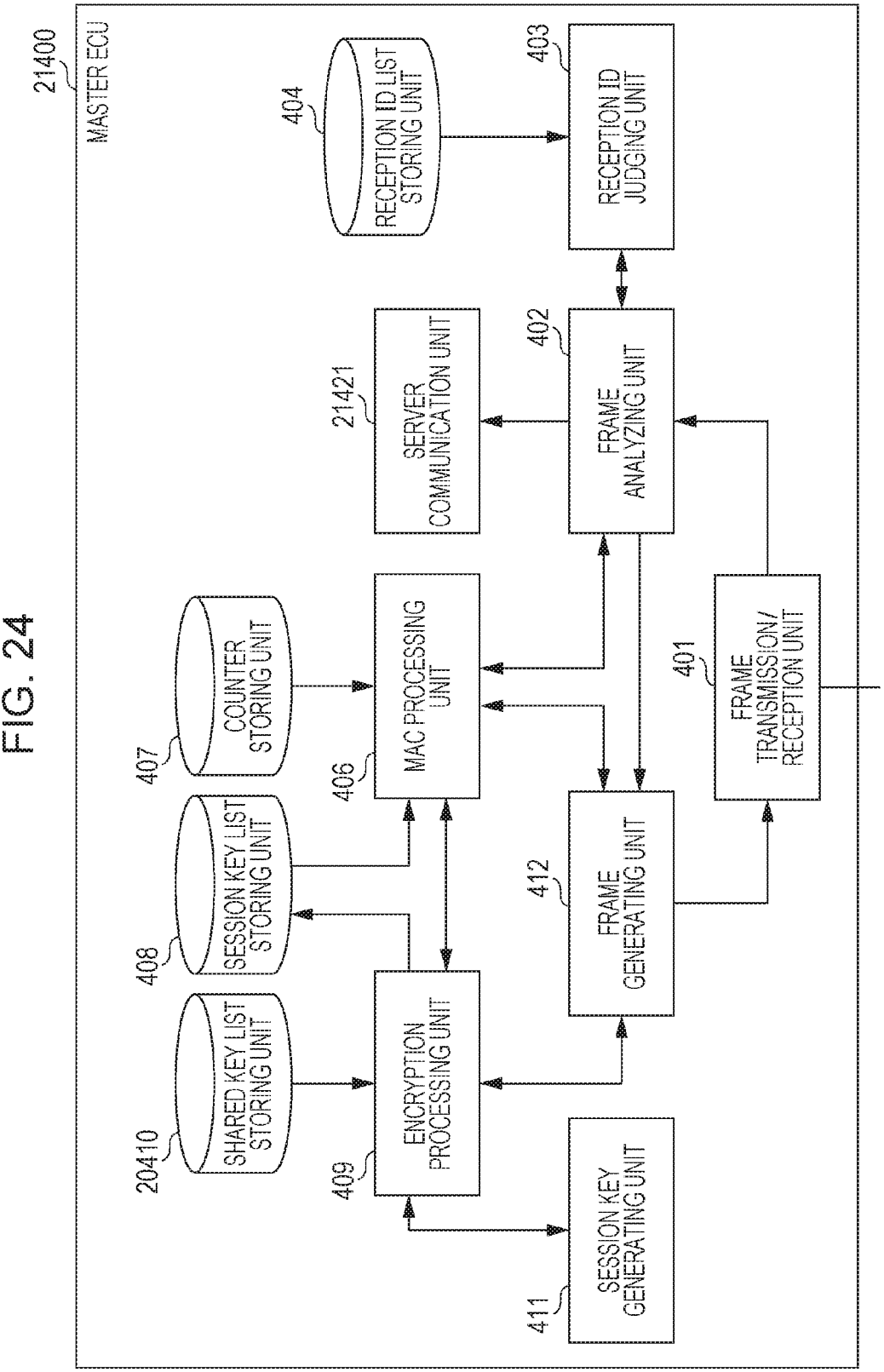
FIG. 24 is a configuration diagram of a master ECU (key managing device) according to a modification of the second embodiment.

FIG. 24 is a configuration diagram of the master ECU 21400. The master ECU 21400 includes the frame transmission/reception unit 401, the frame analyzing unit 402, the reception ID judging unit 403, the reception ID list storing unit 404, the MAC processing unit 406, the counter storing unit 407, the session key list storing unit 408, the encryption processing unit 409, the shared key list storing unit 20410, the session key generating unit 411, the frame generating unit 412, and a server communication unit 21412. These components are functional components, and the functions thereof are realized by a communication circuit in the master ECU 21400, a processor or digital circuit of the like that executes the control program stored in the memory, and so forth. Note that the components of the master ECU 21400 that are the same as the components of the master ECU 400 or master ECU 20400 (see FIGS. 3 and 20) are denoted by the same reference numerals, and description will be omitted as appropriate.

In a case of having succeeded in verification, as the result of verifying a MAC of a data frame at the MAC processing unit 406, the frame analyzing unit 402 notifies the server communication unit 21412 of the CAN-ID of the data frame and the value of the data field.

The server communication unit 21412 has a function of communicating with an external server wirelessly. The server communication unit 21412 correlates the CAN-IDs of all data frames received from the frame analyzing unit 402 and the values of the data fields, notifies the server, and receives determination results from the server. In a case where an error occurs as a result of determination, the driver is notified by displaying the content of the error on the display device, for example. In a case where the determination results at the server regarding a serial ID notification frame are an error, the master ECU 21400 can keep transmission of session keys to the ECUs from being performed.

Note that the external server is a computer communicable with the master ECU 21400, and has a function of, in a case of having received from the master ECU 21400 a CAN-ID regarding an serial ID notification frame and a value indicating the serial ID that is the value of the data field, identifying the transmission source ECU from the CAN-ID set to each ECU beforehand, and making judgment regarding whether or not the serial ID managed correlated with that ECU and the received serial ID match. In a case where these match, a determination result of normal is transmitted to the master ECU 21400, and if not matching, an error is transmitted.

2.8 Shared Key Verification Sequence

Figure 25:
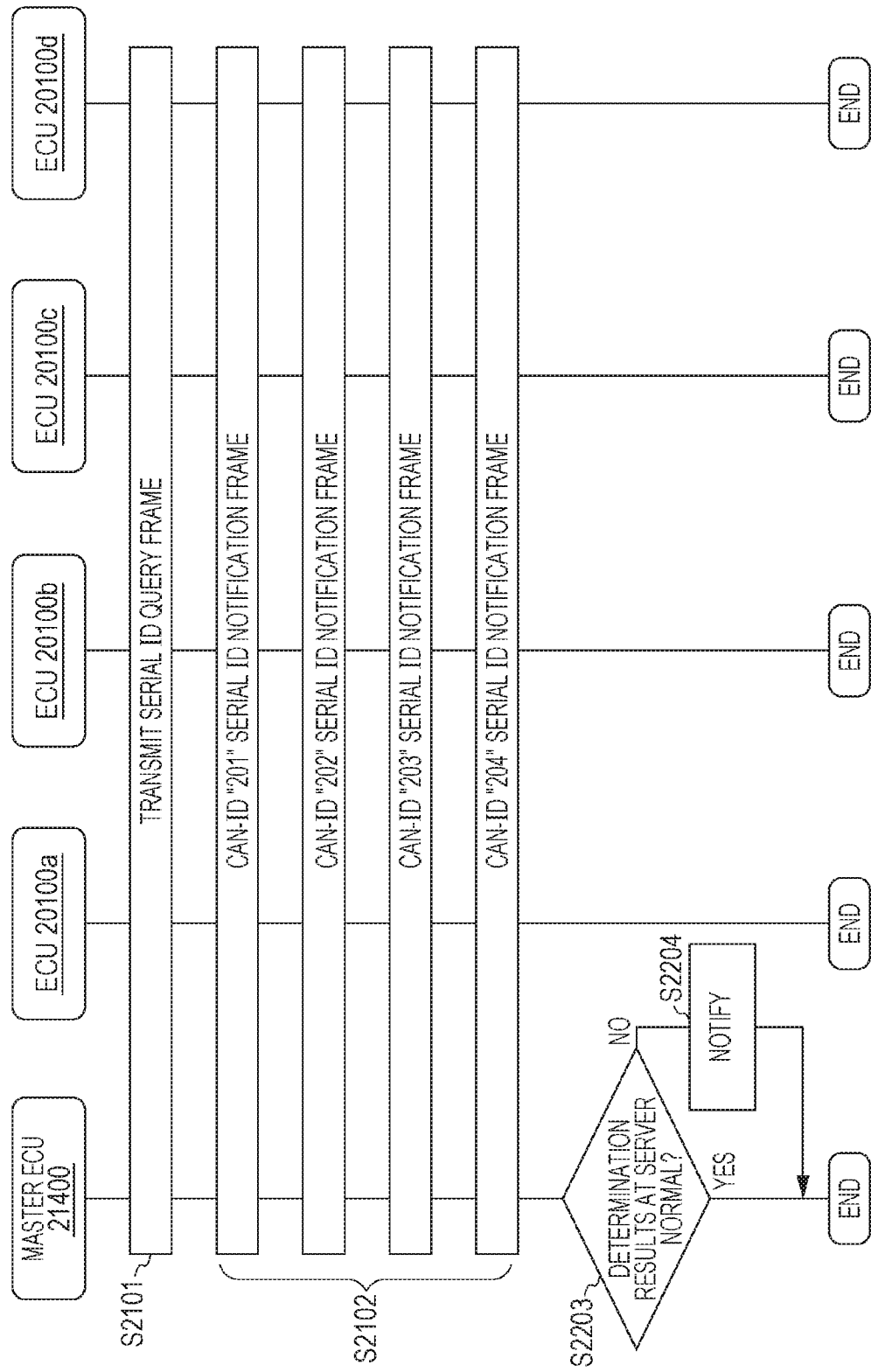
FIG. 25 is a diagram illustrating an example of a shared key verification sequence between the master ECU (key managing device) according to the modification of the second embodiment and ECUs.

The following is a description of operations of the master ECU 21400 inspecting the security state relating to shared keys, with reference to FIG. 25. FIG. 25 illustrates an example of a shared key verification sequence by the master ECU 21400, the ECU 20100*a*, the ECU 20100*b*, the ECU 20100*c*, and the ECU 20100*d*. Note that this shared key verification sequence is executed when the vehicle in which is installed the onboard network system is in a particular state (e.g., a stopped state before driving), for example. As for a specific example, this is executed immediately after entering the accessory-on (ACC-ON) state. Note that processing (steps) in FIG. 25 that are the same as those shown in FIG. 23 are denoted by the same reference numerals, and description will be omitted here.

In step S2102, serial ID notification frames transmitted by the ECU 20100*a*, ECU 20100*b*, ECU 20100*c*, and ECU 20100*d* sequentially appear on the bus 200.

The master ECU 21400 transmits to the external server the CAN-IDs of the serial ID notification frames sequentially appearing on the bus 200 and the serial ID included in the serial ID notification frames. Confirmation is made regarding whether or not the security state of the shared keys is suitable, by whether or not the determination results returned from the server are normal (step S2203). In a case where the determination results from the server are an error, i.e., the serial ID does not match, the master ECU 21400 notifies the driver by display of information indicating an error (information indicating that there is an unauthorized ECU, etc.) on the display device (step S2204).

2.9 Advantages of Modification of Second Embodiment

In the onboard network system according to the modification of the second embodiment, the master ECU 21400 communicates with an external server in a case where the vehicle is in a particular state such as a stopped state or the like, and causes the server to determine whether the serial IDs that the ECUs store are suitable, thereby verifying whether or not the security state of the shared keys is appropriate. In a case where the configuration of the onboard network system has been changed to where the correlation between the ECU and the serial ID managed by the server differs, such as in a case where an unauthorized ECU with an unauthorizedly copied shared key is connected to the onboard network system, this is determined to be an error by the server. In a case where the security state is inappropriate, safety can be secured by notification and the like. The external server can collect information of the serial IDs of the ECUs from the master ECU 21400 in the onboard network system and confirm the integrity, so the security state of the shared keys can be determined more appropriately.

Third Embodiment

As an embodiment of the present disclosure, an onboard network system will be described including a master ECU (key managing device) 30400 that inspects the security state of the shared key by confirming the order of responses from the ECUs as to a survival confirmation frame. The onboard network system according to the present embodiment has the master ECU 400 in the onboard network system 10 according to the first embodiment (see FIG. 1) replaced with the master ECU 30400 (described later), and the ECUs 100*a* through 100*d* replaced with the ECUs 20100*a* through 20100*d*.

3.1 Configuration of Master ECU 30400

In the same way as the master ECU 400, the master ECU 30400 is connected to the bus 200, as a type of ECU serving as a key managing device. The master ECU 30400 stores a shared key shared with one or more ECUs out of the multiple ECUs connected to the bus 200 besides itself, to use for transmitting session keys mutually between the one or more ECUs for encryption processing relating to frames (including MAC processing), and functions to manage the security state of the shared key. The master ECU 30400 transmits a survival confirmation frame requesting each ECU to transmit information (response), stores the order in which the response of each ECU has been received, and compares the order of having received the responses in accordance with the state of the vehicle, thereby inspecting the security state of the shared key. Description will be made here where a serial ID notification frame including a serial ID is transmitted, as an example of transmission of information from each ECU as a response to the survival confirmation frame.

Figure 26:
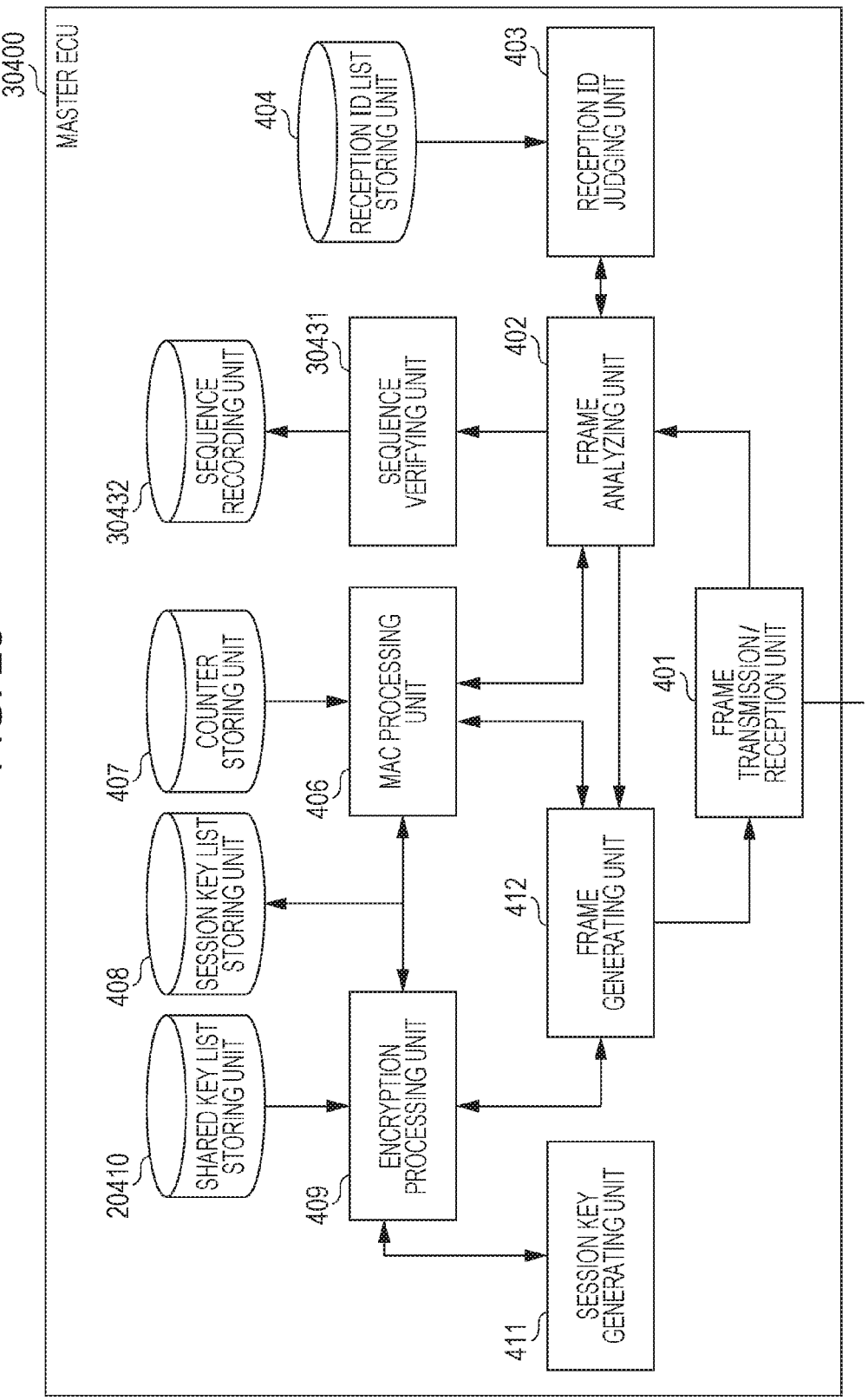
FIG. 26 is a configuration diagram of a master ECU (key managing device) according to a third embodiment.

FIG. 26 is a configuration diagram of the master ECU 30400. As illustrated in FIG. 26, the master ECU 30400 includes the frame transmission/reception unit 401, the frame analyzing unit 402, the reception ID judging unit 403, the reception ID list storing unit 404, the MAC processing unit 406, the counter storing unit 407, the session key list storing unit 408, the encryption processing unit 409, the shared key list storing unit 20410, the session key generating unit 411, the frame generating unit 412, a sequence verifying unit 30431, and a sequence recording unit 30432. Note that the components that are the same as those shown in the first and second embodiments are denoted by the same reference numerals, and description will be omitted as appropriate.

The reception ID list that the reception ID list storing unit 404 stores includes CAN-IDs of serial ID notification frames of the ECUs, as shown in the second embodiment. In a case of having succeeded in verification as a result of the verification of the MAC of the data frame in the MAC processing unit 406, the frame analyzing unit 402 notifies the sequence verifying unit 30431 of the CAN-ID of that data frame and the value of the data field.

The sequence verifying unit 30431 acquires from the frame analyzing unit 402 a set of CAN-ID and data field value regarding a serial ID notification frame identified by the CAN-ID, received as a response to a first survival confirmation frame, and records this as a sequence recording list by notifying the sets in the order of acquisition to the sequence recording unit 30432. The sequence verifying unit 30431 reads out from the sequence recording unit 30432 the sequence recording list where the sets of CAN-ID and data field value recorded the previous time have been ordered, and confirms whether or not this matches the order of the sets acquired from the frame analyzing unit 402. In a case where the order of receipt of serial ID notification frames form the ECUs as responses to the survival confirmation frame differ between the previous time and this time, the sequence verifying unit 30431 performs error processing such as displaying an error on the display device. Besides displaying an error, other examples or error processing may include recording in a log, keeping session keys from being transmitted to the ECUs, and so forth. The sequence verifying unit 30431 may further confirm the serial IDs based on the shared key list stored in the shared key list storing unit 20410, as with the list confirmation unit 20421 in the second embodiment, for example.

The sequence recording unit 30432 records the set of CAN-ID and data field value as a sequence recording list, in the order of notification. Note that this may recorded with only the CAN-ID correlated with the order (number). In this case, the sequence verifying unit 30431 notifies the received CAN-IDs n the order of reception to the sequence recording unit 30432 so as to be recorded, and confirms whether or not the order of the CAN-IDs received this time matches the order of CAN-IDs recorded the previous time.

3.2 Example of Sequence Recording List

Figure 27:
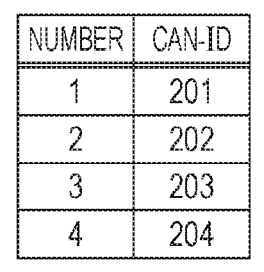

FIG. 27 illustrates an example of a sequence recording list. The example in this drawing indicates that serial ID notification frames have been transmitted in the order of CAN-IDs "201", "202", "203", and "204", as responses to the previous survival confirmation frame.

3.3 Shared Key Verification Sequence

Figure 28:
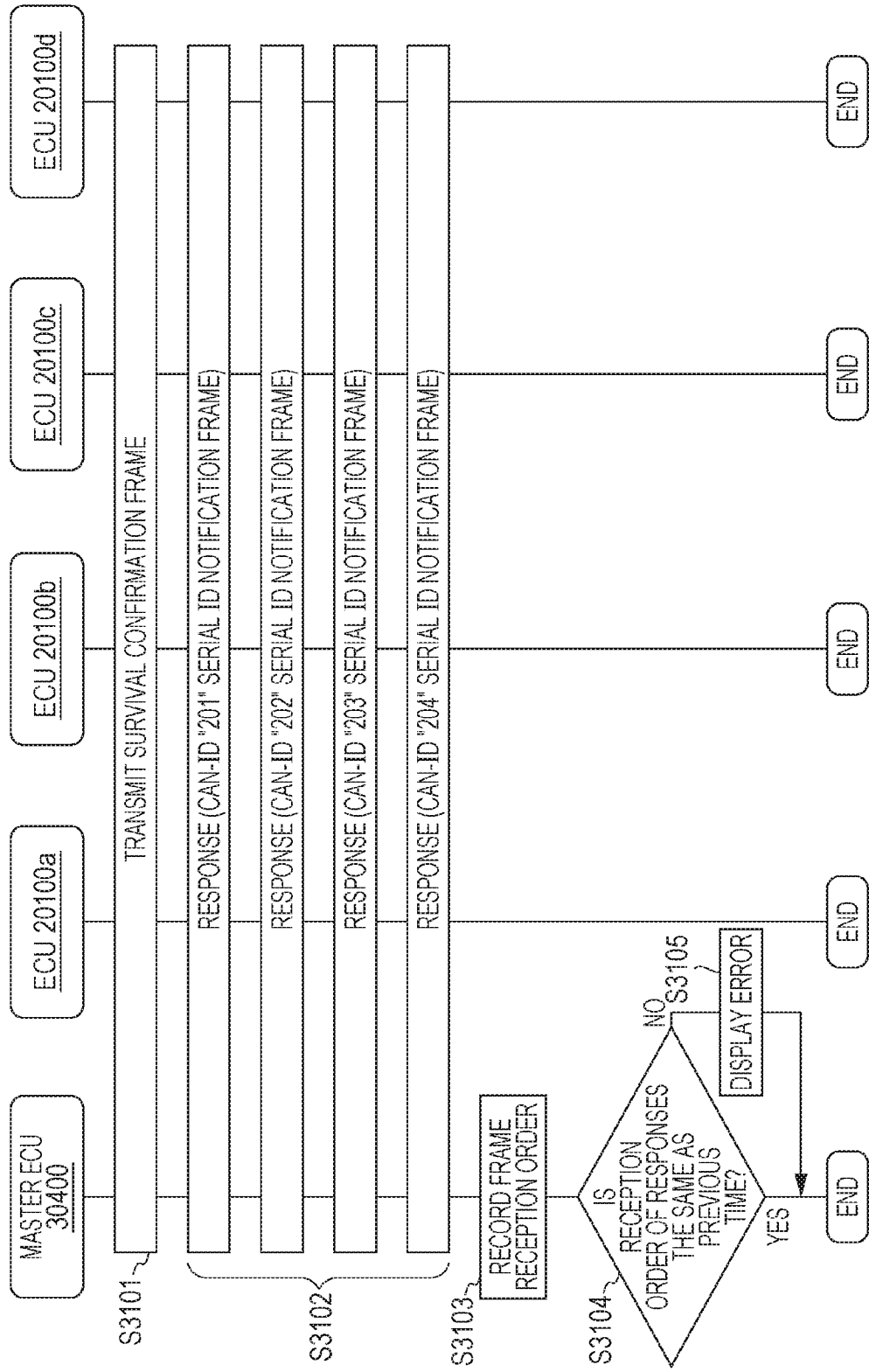
FIG. 28 is a diagram illustrating an example of a shared key verification sequence between the master ECU (key managing device) according to the third embodiment and ECUs.

The following is a description of operations of the master ECU 30400 inspecting the security state relating to shared keys, by confirmation of the order of responses from the ECUs to the survival confirmation frame, with reference to FIG. 28.

FIG. 28 illustrates an example of a shared key verification sequence by the master ECU 30400, the ECU 20100*a*, the ECU 20100*b*, the ECU 20100*c*, and the ECU 20100*d*. Note that this shared key verification sequence is executed when the vehicle in which is installed the onboard network system is in a particular state (e.g., a stopped state before driving), for example. As for a specific example, this is executed immediately after entering the accessory-on (ACC-ON) state and immediately after entering the accessory-off (ACC-OFF) state.

The master ECU 30400 transmits a survival confirmation frame to each of the ECUs (step S3101). Thus, the survival confirmation frame appears on the bus 200.

The ECUs 20100*a* through 20100*d* each receive the survival confirmation frame from the bus 200, and transmit a serial ID notification frame including data in the data field where a MAC has been attached to the serial ID that each stores (step S3102). After having received the survival confirmation frame, the ECUs each standby for a standby time unique to each ECU, and then transmit the serial ID notification frame as a response to the survival confirmation frame. In the example in FIG. 28, the ECU 20100*a*, ECU 20100*b*, ECU 20100*c*, and ECU 20100*d* respectively transmit serial ID notification frames to which are attached CAN-IDs "201", "202", "203", "204", in that order. Thus, the serial ID notification frames sequentially appear on the bus 200.

With regard to the serial ID notification frames sequentially appearing on the bus 200, the master ECU 30400 records the CAN-IDs of the serial ID notification frames as a sequence recording list in the order of reception (step S3103). The master ECU 30400 compares the order of reception of CAN-IDs that are the responses this time with the order of reception the previous time, based on the record of CAN-ID reception order relating to responses obtained at the time of having transmitted the survival confirmation frame the previous time (the sequence recording list recorded the previous time), and distinguishes whether or not the order of reception is the same as the previous time (step S3104). If not the same, an error is displayed on the display device (step S3105). Note that in step S3104 the master ECU 30400 may determine not only the order of reception, but further whether or not the set of serial IDs acquired from the received CAN-ID and data field are the same as the previous time. Besides displaying an error on the display device in step S3105, the error may be recorded in a log, notified to an external server, a message (frame) notifying the error may be transmitted, or the like. When a message notifying an error is flowing on the bus 200, a particular ECU may receive this, and the particular ECU may perform error notification (generating a sound indicating an error, an error display, lighting an error lamp, etc.).

3.4 Advantages of Third Embodiment

In the onboard network system according to the third embodiment, in a state where the vehicle is in a particular state, such as in a stopped state or the like, the master ECU 30400 (a first-type ECU serving as a key managing device so as to speak) transmits a survival confirmation frame as a request to the ECU 20100*a*, ECU 20100*b*, ECU 20100*c*, and ECU 20100*d*, (second-type ECUs), and confirms the order in which responses as responses to this request (serial ID notification frames) appear on the bus 200, and thus can confirm whether the configuration of the onboard network system has been changed. That is to say, the first-type ECU confirms (inspects) the order of responses by distinguishing whether the CAN-IDs have been received in the order of a predetermined order list (e.g., the sequence recording list recorded the previous time), based on the CAN-IDs of the frames sequentially received from the multiple second-type ECUs after having transmitted the frame indicating a predetermined request (e.g., survival confirmation frame). Accordingly, confirming the response order enables verification of the security state of the shared keys, and safety can be secured by notification or the like in a case where the security state is unsuitable. Performing the shared key security state inspection in a stopped state such as at the time of ACC-ON and ACC-OFF, avoiding increased processing load on the ECUs and increased traffic on the bus 200 while the vehicle is driving, is useful.

3.5 Modification of Third Embodiment

The onboard network system including a master ECU 31400 (key managing device) which is a partial modification of the above-described master ECU 30400 will be described below. The master ECU 31400 is basically the same as the master ECU 30400, but the method of confirming the order of responses that the ECUs return after having transmitted the survival confirmation frame as a request differs. That is to say, the master ECU 31400 has a function of confirming the order of responses (serial ID notification frames) received from the ECUs by communication with a server that is external from the onboard network system (outside of the vehicle), This server is a computer that manages information indicating the order of CAN-IDs in the serial ID notification frames transmitted as responses to the survival confirmation frame.

3.6 Configuration of Master ECU 31400

Figure 29:
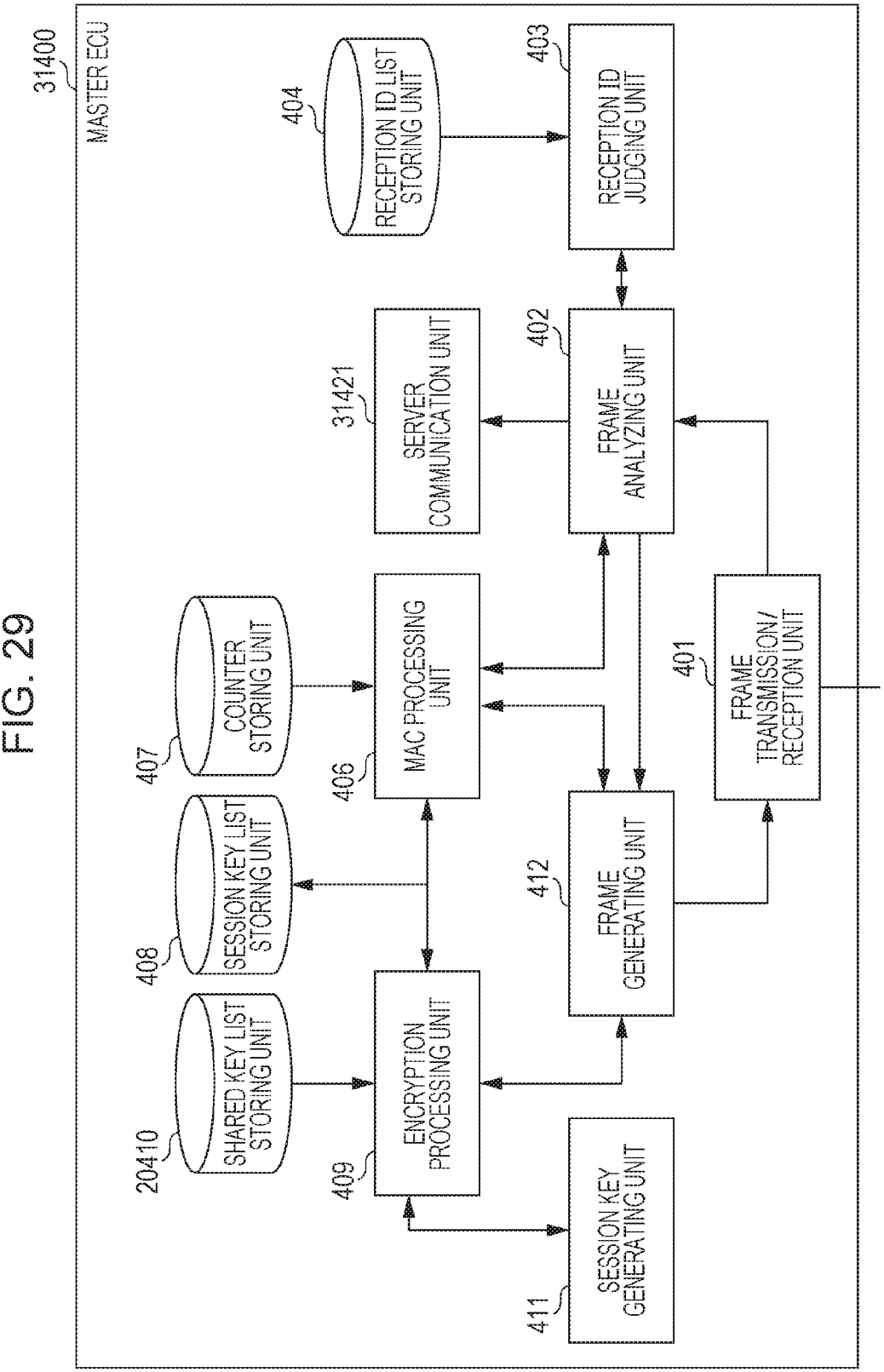
FIG. 29 is a configuration diagram of a master ECU (key managing device) according to a modification of the third embodiment.

FIG. 29 is a configuration diagram of the master ECU 31400. The master ECU 31400 includes the frame transmission/reception unit 401, the frame analyzing unit 402, the reception ID judging unit 403, the reception ID list storing unit 404, the MAC processing unit 406, the counter storing unit 407, the session key list storing unit 408, the encryption processing unit 409, the shared key list storing unit 20410, the session key generating unit 411, the frame generating unit 412, and a server communication unit 31412. These components are functional components, and the functions thereof are realized by a communication circuit in the master ECU 31400, a processor or digital circuit of the like that executes the program stored in the memory, and so forth. Note that the components of the master ECU 31400 that are the same as the components of the master ECU 400 and master ECU 20400 (see FIGS. 3 and 20) are denoted by the same reference numerals, and description will be omitted as appropriate.

In a case of having succeeded in verification, as the result of verifying a MAC of a data frame at the MAC processing unit 406, the frame analyzing unit 402 notifies the server communication unit 31412 of the CAN-ID of the data frame and the value of the data field.

The server communication unit 31412 has a function of communicating with an external server wirelessly. The server communication unit 31412 correlates the CAN-IDs of all data frames received from the frame analyzing unit 402 and the values of the data fields, notifies the server, and receives determination results from the server. In a case where an error occurs as a result of determination, the driver is notified by displaying the content of the error on the display device, for example. In a case where the determination results at the server regarding the order of serial ID notification frames transmitted from the ECUs as responses to the survival confirmation frame as a request are an error, the master ECU 31400 can display an error, record in a log, or the like. Also, in a case of an error, the master ECU 31400 can keep transmission of session keys to the ECUs from being performed.

Note that the external server is a computer communicable with the master ECU 31400, and has a function of, in a case of having received from the master ECU 30400 a series of CAN-IDs and values indicating serial IDs that are data field values, regarding serial ID notification frames, recording and managing the CAN-IDs and serial IDs predetermined to each transmission source ECU, in the order of serial ID reception, and comparing with the contents serially received and recorded the previous time. In a case where the comparison shows that the serial ID notification frames serially received match the contents recorded the previous time (i.e., a case where the order of CAN-IDs matches, and also the combination with serial IDs also matches), a determination result of normal is transmitted to the master ECU 31400, and if not matching, an error is transmitted.

3.7 Shared Key Verification Sequence

Figure 30:
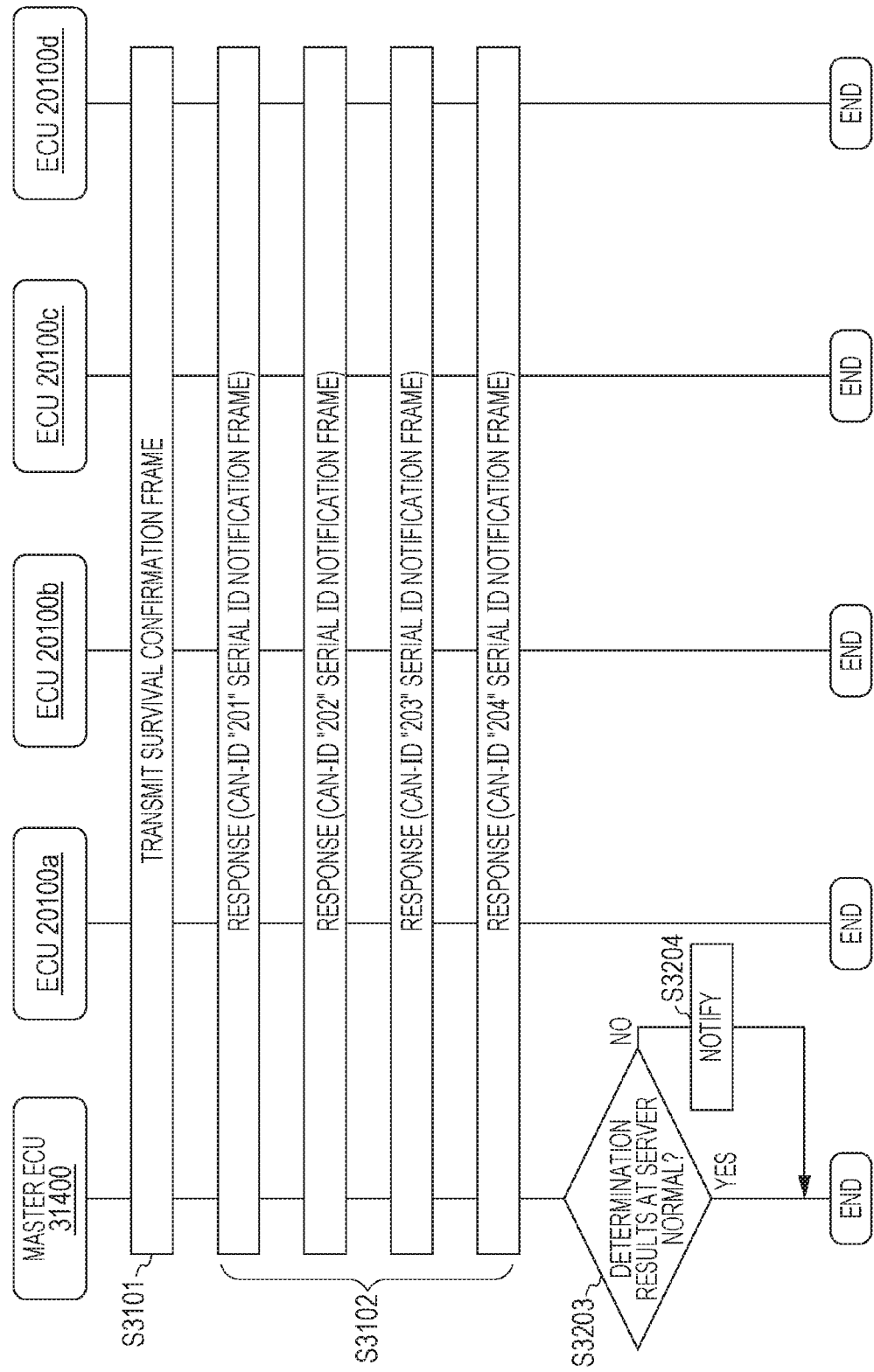
FIG. 30 is a diagram illustrating an example of a shared key verification sequence between the master ECU (key managing device) according to the modification of the third embodiment and ECUs.

The following is a description of operations of the master ECU 31400 inspecting the security state relating to shared keys, with reference to FIG. 30. FIG. 30 illustrates an example of a shared key verification sequence by the master ECU 31400, the ECU 20100*a*, the ECU 20100*b*, the ECU 20100*c*, and the ECU 20100*d*. Note that this shared key verification sequence is executed when the vehicle in which is installed the onboard network system is in a particular state (e.g., a stopped state before driving), for example. As for a specific example, this is executed immediately after entering the accessory-on (ACC-ON) state and immediately after entering the accessory-off (ACC-OFF) state. Note that processing (steps) in FIG. 30 that are the same as those shown in FIG. 28 are denoted by the same reference numerals, and description will be omitted here.

In step S3102, serial ID notification frames transmitted by the ECU 20100*a*, ECU 20100*b*, ECU 20100*c*, and ECU 20100*d* as responses to the survival confirmation frame sequentially appear on the bus 200.

The master ECU 31400 consecutively transmits to the server the sets of CAN-IDs of the serial ID notification frames consecutively and sequentially appearing on the bus 200 and the values included in the serial ID notification frames. Whether or not the security state of the shared keys is suitable is inspected, by whether or not the determination results returned from the server are normal (step S3203). In a case where the determination results from the server are an error, i.e., the order of responses from the ECUs as to the survival confirmation frame does not match the order of responses as to the survival confirmation frame the previous time, or the contents of the responses (serial IDs) do not match the previous time, and accordingly the security state of the shared key is in appropriate, the master ECU 31400 notifies the driver by display of information indicating an error (information indicating that there is an unauthorized ECU, etc.) on the display device (step S3204).

3.8 Advantages of Modification of Third Embodiment

In the onboard network system according to the modification of the third embodiment, the master ECU 31400 communicates with an external server in a case where the vehicle is in a particular state such as a stopped state or the like, and causes the server to determine whether the order of frames that the ECUs transmit is suitable, thereby verifying whether or not the security state of the shared keys is appropriate. In a case where the configuration of the onboard network system has been changed, the order of frames transmitted by the ECUs changes as compared to before, so this is determined to be an error by the server. In a case where the security state is inappropriate (a case where determination of an error has been made), safety can be secured by notification and the like. The external server can collect information of the serial IDs of the ECUs from the master ECU 31400 in the onboard network system installed in multiple vehicles and confirm the integrity, so the security state of the shared keys can be inspected more appropriately.

Other Embodiments

The first through third embodiments have been described above as examples of the technology according to the present disclosure. However, the technology according to the present disclosure is not restricted to this, and embodiments where modifications, substitutions, addition, omission, and so forth have been performed as appropriate are also applicable. For example, the following modifications are also included as an embodiment.

(1) Although an example has been described in the above embodiments where frames are periodically transmitted by the ECUs, an arrangement may be made where frames are transmitted as an event to notify a state change. For example, an arrangement may be made where a frame is transmitted only in a case where the door open/closed state changes, instead of periodically transmitting the door open/closed state. Further, an arrangement may be made where the ECU transmits frames both periodically and when a state change has occurred.

(2) Although an example has been described in the above embodiments where a MAC is generated (calculated) by computation based on the CAN-ID and data value and counter value, it is sufficient to generate a MAC reflecting the content of a part of the data frame (i.e., based on partial content), and the MAC may be generated from the data value alone. Alternatively, the MAC may be generated from the counter value alone. It is sufficient for the MAC verification method at the ECU receiving the data frame to correspond to the method of attaching the MAC to the data frame that the ECU transmitting the data frame uses. The data frame to which the MAC is attached may include, in the data field, part of all of counter values, besides the data value and MAC. The size of the MAC included in the frame is not restricted to four bytes, and may be varied sizes from one CAN-ID to another. The MAC may be divided into a plurality, and the divided MAC included in frames, so that the MAC is transmitted spanning multiple frames. The size of the counter value also is not restricted to one byte.

(3) Although an example has been described in the above embodiments where the counter value is incremented with each transmission, an arrangement may be made where the counter value is automatically incremented according to the point-in-time. Alternatively, the point-in-time itself may be used instead of the counter. Computation of the counter value is not restricted to incrementing (increasing by 1). This may be increased by 2 or more, and instead of counting up by incrementing, this may be counting down by decrement. Computation of the counter value may be performed by bit-shift, or may be computation where an output value, identified based on a predetermined algorithm taking the computation result of the previous time as the input value, is taken as the computation results.

(4) Although an example has been described in the above embodiments where the data frame in the CAN protocol is described in a standard ID format, this may be an extended ID format. In a case of the extended ID format, the CAN-ID is expressed as a total of 29 bits of the base ID at the ID position in the standard ID format, and the extended ID.

(5) Although an example has been described in the above embodiments where the MAC calculation algorithm is AES-CMAC, this may be Cipher Block Chaining Mess age Authentication Code (CBC-MAC) or Hash-based Message Authentication Code (HMAC). The padding used in MAC calculation may be zero padding, ISO10126, PKCS #1, PKCS #5. PKCS #7, or nay other padding method where the block data size is necessary for calculation. A method for changing the block size to four bytes or the like may use padding at the any of the start, end or middle. Data used for MAC calculation does not have to be consecutive data (e.g., four byte worth of consecutive data), and may be data that has been collected one bit at a time following a particular rule and linked.

(6) Although an example has been described in the above embodiments where the session key is four bytes (see FIG. 6), the size of the session key is not restricted to this, and may by eight bytes or the like. The session key may be transmitted spanning multiple frames, if the session key is of a size that cannot be stored in one frame. Note that transmission of the session key ma be realized by any method as long as the transmitting side and the receiving side can store the same session key. Besides being realized by transmitting an encrypted session key, this may be realized by transmitting information necessary to generate a session key.

(7) Although an example has been described in the above embodiments where particular states (immediately after ACC-ON, immediately after ACC-OFF, etc.) are given as the particular state for inspecting the security state of the shared key (shared key verification sequence), other particular states may be used. For example, this may be immediately after the engine is started or immediately after a state where the engine is off. Alternatively, a state where the vehicle is not driving may be the particular state for inspecting the security state of the shared key (confirmation, etc.), such as immediately after ACC-ON, immediately after ACC-OFF, a state where the engine is off, and so forth. Performing the inspection of the security state of the shared key only in a particular state where the vehicle is not driving is useful from the point of preventing increase in the load on the ECUs. Also, "fueling" may be determined according to whether the fuel cap is open or closed, and start the shared key verification sequence while fueling. In a case of an electric vehicle, "charging" may be determined by detecting that a charging plug has been connected, and start the shared key verification sequence while charging. Further, switching between "parked", "stopped", and "driving" and so forth may be distinguished based on the gearshift or the like of the vehicle, and the shared key verification sequence may be started while parked, for example, or "high-speed driving" and "low-speed driving" may be distinguished and the shared key verification sequence may be started during low-speed driving. The execution timing of the shared key verification sequence in the modification of the third embodiment is not restricted to immediately after ACC-ON and immediately after ACC-OFF, but rather may be only immediately after ACC-ON or only immediately after ACC-OFF, or may be at another timing (immediately after starting the engine, etc.).

(8) One shared key shown in the above embodiments may be stored for each ECU, or in a case where the ECU performs frame transmission using multiple CAN-IDs, one may be stored for each CAN-ID. The increments of the master ECU and one or multiple other ECUs each storing shared keys may be optionally decided in the onboard network system.

(9) Although an example has been described in the above embodiments where one counter (transmission counter value and reception counter value) is stored for each CAN-ID, this may be one for each ECU (i.e., each group of one or more CAN-IDs). Alternatively, a common counter value may be used for all frames flowing over the same bus.

(10) Transmission of information (frame) as a response to the survival confirmation frame in the above-described third embodiment does not necessarily have to be transmission of a serial ID notification frame, and a serial ID does not necessarily have to be included in the data field. Besides the method of confirming matching with the order from the previous time as a method to confirm (inspect) the transmission order of frames, as responses from the ECUs as to the survival confirmation frame, a method may be used to confirm matching with the order in a list recording the order beforehand.

(11) The shared keys shared between the master ECU (key managing device) and other multiple ECUs (keys shared before transmission of session keys) shown in the above-described embodiments may be shared keys in a shared key encryption system (secret keys), or alternatively may be a key pair (public key and secret key) in a public key encryption system. That is to say, it is sufficient for a first-type electronic control unit (master ECU) serving as the key managing device, and one or more second-type electronic control units (ECUs other than the master ECU) mutually storing sharked keys that are the same or are a key pair. In addition to the respective devices (first-type ECU and second-type ECU) each storing the same key, an arrangement in which each device (first-type ECU and second-type ECU) stores the same key pair of public key and secret key is also referred to as sharing a shared key. As one example, each ECU in the onboard network system may have individual secret keys, the master ECU have public keys corresponding to the secret keys of the ECUs, with the master ECU encrypting session keys using the public keys and transmitting to the ECUs.

(12) Although an example has been described in the above embodiments where the ECU that receives the data frames being exchanged among the ECUs performs verification of the MACs thereof, an arrangement may be made where a MAC verification ECU exists in the onboard network system to verify the MACs given to all data frames by itself. This MAC verification ECU may acquire and store the MAC generating keys and counter values corresponding to all CAN-IDs. In a case where the MAC verification ECU determines that there is an error as the result of MAC verification by this MAC verification ECU, an error frame may be transmitted to prevent reception at other ECUs.

(13) Although an example has been described in the above first and second embodiments where the security state of the validity and so forth of the shared keys that all ECUs store is inspected (verified) all at once, inspection (verification) may be individually performed at each ECU. Depending on the state of the vehicle, inspection (verification) processing of particular types of ECUs may be skipped. For example, in a state while the vehicle is driving, inspection (verification) processing (e.g., transmission of expiration date notification frames, etc.) relating to driving system ECUs related to driving (e.g., the ECU 100a related to the engine, etc.) may be skipped.

(14) Although the master ECU and other ECUs in the above embodiments have been described as having digital circuits such as a processor, memory, and so forth, analog circuits, communication circuits, and so forth, the ECUs may include other hardware component such as a hard disk, display, keyboard, mouse, and so forth. The functions thereof may be realized by dedicated hardware (digital circuits and so forth) instead of realizing the functions by software by a control program stored in memory being executed by the processor.

(15) Part or all of the components of which the above-described devices are configured may be configured as one system Large Scale Integration (LSI). A system LSI is a super-multifunctional LSI fabricated with multiple components integrated on a single chip, and specifically is a computer system configured including a microprocessor, ROM, RAM, and so forth. The RAM stores the computer program. The system LSI achieves its functions by the microprocessor operating according to the computer program. The components of which the above-described devices are configured may each be independently formed as a single chip, or part or all may be included in a single chip. While a system LSI has been mentioned, there are different names according to the degree of integration, such as IC, LSI, super LSI, and ultra LSI. The way in which the integrated circuit is formed is not restricted to LSIs, and may be realized by dedicated circuits or general-purpose processors. A Field Programmable Gate Array (FPGA) capable of being programmed after manufacturing the LSI, or a reconfigurable processor of which the connections and settings of circuit cells within the LSI can be reconfigured, may be used. Moreover, in the event of the advent of an integrated circuit technology which would replace LSIs by advance of semiconductor technology or a separate technology derived therefrom, such a technology may be used for integration of the functional blocks, as a matter of course. Application of biotechnology is a possibility.

(16) Part or all of the components of which the above-described devices are configured may be configured as an integrated circuit (IC) card detachably mountable to each device, or a standalone module. The IC card or standalone module is a computer system configured including a microprocessor, ROM, RAM, and so forth. The IC card or standalone module may include the above-described super-multifunctional LSI. The IC card or standalone module achieves its functions by the microprocessor operating according to the computer program. The IC card or standalone module may be tamper-resistant.

(17) The present disclosure may in one form be a key management method such as the shared key verification sequence described above, may be a computer program which realizes these methods by a computer, or may be digital signals made up of the computer program. The present disclosure may in one form be the computer program or the digital signals recorded in a computer-readable recording medium, such as for example, a flexible disk, hard disk, CD-ROM, MO, DVD, DVD-ROM, DVD-RAM, BD (Blu-ray (a registered trademark) Disc), semiconductor memory, or the like. The present disclosure may also be the digital signals recorded in these recording mediums. The present disclosure may be an arrangement where the computer program or the digital signals are transmitted over an electric communication line, wireless or cable communication line, a network of which the Internet is representative, data broadcasting, or the like. The present disclosure may be a computer system having a microprocessor and memory, where the memory stores the computer program, and the microprocessor operates according to the computer program. This may also be carried out by another independent computer system, by the program or digital signals being recorded in the recording medium and being transported, or by the program or digital signals being transferred over the network or the like.

(18) The forms realized by optionally combining the components and functions exemplified in the above-described embodiments and the above-described modifications are also included in the scope of the present disclosure.

The present disclosure is applicable to management of keys used in ECUs in an onboard network system.

What is claimed is:

1. A key management method in a key management device serving as an electronic control unit (ECU) in an onboard network system having a plurality of electronic control units (ECUs) that perform communication by frames via a network, the method comprising:
storing, in a first-type electronic control unit out of the plurality of electronic control units, a shared key to be mutually shared with one or more second-type electronic control units other than the first-type electronic control unit, the shared key also being stored in the one or more second-type electronic control units other than the first-type electronic control unit;
executing encryption processing regarding a frame transmitted or received via the network, based on the shared key; and
executing, by the first-type electronic control unit, inspection of a security state of the shared key stored by the second-type electronic control units in a case where a vehicle in which the onboard network system is installed is in at least one particular state,
wherein the at least one particular state includes at least one of the following particular states,
(a) the vehicle is not driving and is an accessory-on state,
(b) a fuel cap of the vehicle is open, and the vehicle is not driving and is fueling,
(c) the vehicle is parked, which is indicated by the gearshift,
(d) the vehicle is in a stopped state before driving, which is indicated by the gearshift, and
(e) a charging plug is connected to the vehicle, and the vehicle is electrically charging.

2. The key management method according to claim 1, wherein the inspection is an inspection relating to an expiration date of the shared key.

3. The key management method according to claim 1, wherein the inspection is an inspection relating to a serial ID of the second-type electronic control unit that stores the shared key.

4. The key management method according to claim 1, wherein, in a case where the plurality of electronic control units includes a plurality of the second-type electronic control units, the inspection is an inspection relating to a transmission order of frames at the plurality of second-type electronic control units.

5. The key management method according to claim 4, wherein the first-type electronic control unit transmits a frame indicating a predetermined request and thereafter sequentially receives frames from the plurality of second-type electronic control units, and based on the IDs of the frames, performs the inspection by distinguishing whether or not the IDs have been received in an order that a predetermined order list indicates.

6. The key management method according to claim 1, wherein the first-type electronic control unit executes the inspection only in a case of the particular state.

7. The key management method according to claim 1, wherein the first-type electronic control unit executes the inspection by communication with a server located externally from the vehicle.

8. The key management method according to claim 1, wherein the plurality of electronic control units perform communication by frames via the network, following a Controller Area Network protocol.

9. An onboard network system having a plurality of electronic control units (ECUs) that perform communication by frames via a network, the system comprising:
a first-type electronic control unit, out of the plurality of electronic control units, configured to store a shared key to be mutually shared with one or more second-type electronic control units other than the first-type electronic control unit, the shared key also being stored in the one or more second-type electronic control units other than the first-type electronic control unit; and each of the second-type electronic control units configured to execute encryption processing regarding a frame transmitted or received via the network, based on the shared key, wherein the first-type electronic control unit executes inspection of a security state of the shared key stored by the second-type electronic control units in a case where a vehicle in which itself is installed is in at least one particular state, (a) the vehicle is not driving and is an accessory-on state,
(b) a fuel cap of the vehicle is open, and the vehicle is not driving and is fueling,
(c) the vehicle is parked, which is indicated by the gearshift,
(d) the vehicle is in a stopped state before driving, which is indicated by the gearshift, and
(e) a charging plug is connected to the vehicle, and the vehicle is electrically charging.

10. A key management device serving as an electronic control unit (ECU) in an onboard network system having a plurality of electronic control units (ECUs) that perform communication by frames via a network, the device comprising:

a processor; and a memory having a computer program stored thereon, the computer program causing the processor to execute operations including storing a shared key to be mutually shared with one or more electronic control units other than itself out of the plurality of electronic control units, the shared key also being stored in the one or more second-type electronic control units other than the first-type electronic control unit, and inspecting of a security state of the shared key stored by the electronic control units other than itself in a case where a vehicle in which itself is installed is in at least one particular state, (a) the vehicle is not driving and is an accessory-on state,
(b) a fuel cap of the vehicle is open, and the vehicle is not driving and is fueling,
(c) the vehicle is parked, which is indicated by the gearshift,
(d) the vehicle is in a stopped state before driving, which is indicated by the gearshift, and
(e) a charging plug is connected to the vehicle, and the vehicle is electrically charging.

* * * * *